US010638087B2

(12) United States Patent
Kondo

(10) Patent No.: US 10,638,087 B2
(45) Date of Patent: Apr. 28, 2020

(54) IMAGE OUTPUT APPARATUS, IMAGE OUTPUT METHOD, AND STORAGE MEDIUM

(71) Applicant: I-CUBED RESEARCH CENTER INC., Tokyo (JP)

(72) Inventor: Tetsujiro Kondo, Tokyo (JP)

(73) Assignee: I-CUBED RESEARCH CENTER INC., Tokyo (JP)

(*) Notice: Subject to any disclaimer, the term of this patent is extended or adjusted under 35 U.S.C. 154(b) by 0 days.

(21) Appl. No.: 15/805,939

(22) Filed: Nov. 7, 2017

(65) Prior Publication Data

US 2018/0063475 A1  Mar. 1, 2018

Related U.S. Application Data

(62) Division of application No. 15/305,751, filed as application No. PCT/JP2015/061806 on Apr. 17, 2015, now abandoned.

(30) Foreign Application Priority Data

Apr. 23, 2014  (JP) ................................. 2014-089493

(51) Int. Cl.
*H04N 7/01* (2006.01)
*G09G 5/00* (2006.01)
(Continued)

(52) U.S. Cl.
CPC ......... *H04N 7/0127* (2013.01); *G06F 3/1446* (2013.01); *G06T 3/40* (2013.01);
(Continued)

(58) Field of Classification Search
CPC ....................................... H04N 7/012
(Continued)

(56) References Cited

U.S. PATENT DOCUMENTS

2007/0104392 A1\* 5/2007 Huang ..................... G06T 3/40
382/298
2008/0143969 A1  6/2008 Aufranc et al.
(Continued)

FOREIGN PATENT DOCUMENTS

CN      101291408 A    10/2008
EP        1983746 A2   10/2008
(Continued)

OTHER PUBLICATIONS

Partial Supplementary European Search Report for European Patent Application No. 15782718.9, dated Aug. 18, 2017.
(Continued)

*Primary Examiner* — Jefferey F Harold
*Assistant Examiner* — Sihar A Karwan
(74) *Attorney, Agent, or Firm* — McDermott Will & Emery LLP

(57) ABSTRACT

In order to solve a problem that conventionally there is no image output apparatus in which a wide-band image can be output in a narrow band, an image output apparatus includes: an accepting unit that accepts first-image information, which is information related to a first image of a first band; and multiple image output units that output second images, each of which is an image of a second band that is narrower than or equal to the first band, using the first-image information, wherein a third image obtained as a result of output of the second images by the multiple image output units is an image of a third band that is wider than the first band. Accordingly, it is possible to provide an image output apparatus in which a wide-band image can be output in a narrow band.

8 Claims, 51 Drawing Sheets

(51) Int. Cl.
*G09G 5/377* (2006.01)
*G09G 5/391* (2006.01)
*H04N 5/74* (2006.01)
*G06F 3/14* (2006.01)
*G09G 3/00* (2006.01)
*G06T 3/40* (2006.01)
*G09G 5/22* (2006.01)
*G09G 5/32* (2006.01)
*H04N 9/31* (2006.01)
*H04N 5/262* (2006.01)

(52) U.S. Cl.
CPC .............. *G09G 3/001* (2013.01); *G09G 3/002* (2013.01); *G09G 5/00* (2013.01); *G09G 5/227* (2013.01); *G09G 5/32* (2013.01); *G09G 5/377* (2013.01); *G09G 5/391* (2013.01); *H04N 5/2628* (2013.01); *H04N 5/74* (2013.01); *H04N 7/01* (2013.01); *H04N 7/0117* (2013.01); *H04N 7/0125* (2013.01); *H04N 9/3147* (2013.01); *H04N 9/3185* (2013.01); *H04N 9/3188* (2013.01); *G09G 2340/045* (2013.01); *G09G 2340/0407* (2013.01); *G09G 2340/0428* (2013.01); *G09G 2340/0435* (2013.01); *G09G 2340/0464* (2013.01)

(58) Field of Classification Search
USPC ........................................................ 348/441
See application file for complete search history.

(56) References Cited

U.S. PATENT DOCUMENTS

| | | | |
|---|---|---|---|
| 2008/0260292 A1 | 10/2008 | Tanaka et al. | |
| 2008/0309884 A1* | 12/2008 | O'Dor et al. | H04N 9/3147 353/7 |
| 2010/0117929 A1* | 5/2010 | Fujimori et al. | G06F 3/1446 345/1.3 |
| 2010/0183225 A1 | 7/2010 | Vantaram et al. | |
| 2013/0321701 A1* | 12/2013 | Halna Du Fretay et al. | H04N 5/04 348/12 |
| 2014/0104582 A1 | 4/2014 | Mori | |

FOREIGN PATENT DOCUMENTS

| | | |
|---|---|---|
| EP | 1300011 B1 | 8/2010 |
| JP | 2001-242435 A | 9/2001 |
| JP | 2002-139792 A | 5/2002 |
| JP | 2003-125317 A | 4/2003 |
| JP | 2004-23460 A | 1/2004 |
| JP | 2005-149322 A | 6/2005 |
| JP | 2005-269529 A | 9/2005 |
| JP | 2006-145933 A | 6/2006 |
| JP | 2006-349791 A | 12/2006 |
| JP | 2007-193135 A | 8/2007 |
| JP | 2008-070397 A | 3/2008 |
| JP | 2010-16555 A | 1/2010 |
| JP | 2010-118940 A | 5/2010 |
| JP | 2010-243545 A | 10/2010 |
| JP | 2011-029727 A | 2/2011 |
| JP | 2011-248238 A | 12/2011 |
| JP | 2012-035413 A | 2/2012 |
| JP | 2013-167660 A | 8/2013 |
| JP | 2014-064227 A | 4/2014 |

OTHER PUBLICATIONS

International Search Report issued in PCT/JP2015/061806 dated Jul. 7, 2015, with English language translation.
Office Action issued in U.S. Appl. No. 15/305,751, dated Apr. 7, 2017.
Extended European Search Report issued in corresponding European Application No. 15782718.9, dated Jan. 22, 2018.
European Office Action issued in Application No. 15782718.9 dated Oct. 26, 2018.
Chinese Office Action issued in Application No. 201580021210.1 dated Oct. 23, 2018, with English translation.
International Search Report issued in corresponding International Application No. PCT/JP2015/061807, dated Jul. 7, 2015, with English translation.
Notification of Reasons for Refusal issued in Japanese Patent Application No. 2014-089494, dated Dec. 4, 2018, with English translation.
Decision of Dismissal of Amendment issued in Japanese Patent Application No. 2014-089494, dated May 31, 2019, with English translation.
Decision of Refusal issued in Japanese Patent Application No. 2014-089494, dated May 31, 2019, with English translation.
Non-Final Office Action issued in corresponding U.S. Appl. No. 15/816,806, dated Dec. 10, 2018.
Decision of Refusal issued in Chinese Patent Application No. 201580021210.1, dated Jul. 23, 2019, with English translation.
"47.4:Invited Paper: Wobulation: Doubling the Addressed Resolution of Projection Displays", Will Allen (Digital Projection and Imaging, Hewlett-Packard, Corvallis, Oregon, USA) and Robert Ulichney (HP Labs, Cambridge, Massachusetts, USA, in the Proceeding of SID 2005 Digest, pp. 1514-1517.
Decision of Refusal, issued in Chinese Patent Application No. 20150021243.6, dated Nov. 26, 2019.

* cited by examiner

IMAGE OUTPUT APPARATUS, IMAGE OUTPUT METHOD, AND STORAGE MEDIUM

CROSS REFERENCE TO RELATED APPLICATIONS

This application is a Divisional Application of U.S. Ser. No. 15/305,751, filed Oct. 21, 2016, which is the U.S. National Phase under 35 U.S.C. § 371 of International Patent Application No. PCT/JP2015/061808, filed on Apr. 17, 2015, which in turn claims the benefit and priority from Japanese Patent Application Number 2014-089493, filed Apr. 23, 2014 the subject matters of which are hereby incorporated by reference.

TECHNICAL FIELD

The present invention relates to an image output apparatus for outputting an image, and the like.

BACKGROUND ART

Conventionally, there is an image processing apparatus for generating, from a first moving image, a second moving image having a higher quality (see Patent Document 1, for example).

CITATION LIST

Patent Document

Patent Document 1: JP 2010-118940A

SUMMARY OF INVENTION

Technical Problem

However, conventional techniques are problematic in that, in accordance with an increase in the information amount of the second moving image, the processing band of an image processing apparatus for generating the second moving image and the output band of an image output apparatus for outputting the second moving image increase at an accelerated pace. Accordingly, the bands in which the second moving image can be processed and output are naturally limited.

Furthermore, an increase in the information amount of the second moving image makes it necessary to change a clock of the first image, which is an input image, to a clock having a higher frequency.

Solution to Problem

A first aspect of the present invention is directed to an image output apparatus, including: an accepting unit that accepts first-image information, which is information related to a first image of a first band; and multiple image output units that output second images, each of which is an image of a second band that is narrower than or equal to the first band, using the first-image information, wherein a third image obtained as a result of output of the second images by the multiple image output units is an image of a third band that is wider than the first band.

With this configuration, an image output apparatus in which a wide-band image can be output in a narrow band is provided.

Furthermore, a second aspect of the present invention is directed to the image output apparatus according to the first aspect, further including a control unit that determines an image that is to be given to each of the multiple image output units, the image using the first-image information accepted by the accepting unit, wherein the multiple image output units output second images, each of which is an image of a second band that is narrower than or equal to the first band, using the image determined by the control unit.

With this configuration, an image output apparatus in which a wide-band image can be output in a narrow band is provided.

Furthermore, a third aspect of the present invention is directed to the image output apparatus according to the second aspect, wherein the control unit determines an image that is to be given to each of the multiple image output units such that part of the first image is given to each of the multiple image output units.

With this configuration, an image output apparatus in which a wide-band image can be output in a narrow band is provided.

Furthermore, a fourth aspect of the present invention is directed to the image output apparatus according to any one of the first to third aspects, wherein the third band is a band that is wider than the first band in terms of space, a band that is wider than the first band in terms of time, or a band that is wider than the first band in terms of gradation.

With this configuration, an image output apparatus in which a wide-band image can be output in a narrow band is provided.

Furthermore, a fifth aspect of the present invention is directed to the image output apparatus according to any one of the first to fourth aspects, wherein the image output units optically output the second images.

With this configuration, an image output apparatus in which a wide-band image can be optically output in a narrow band is provided.

Furthermore, a sixth aspect of the present invention is directed to the image output apparatus according to any one of the first to fourth aspects, wherein the image output units print the second images.

With this configuration, an image output apparatus in which a wide-band image can be printed in a narrow band is provided.

Furthermore, a seventh aspect of the present invention is directed to the image output apparatus according to any one of the first to sixth aspects, wherein two second images output by at least two image output units of the multiple image output units partially overlap each other.

With this configuration, an image output apparatus in which a wide-band image can be output in a narrow band is provided.

Furthermore, an eighth aspect of the present invention is directed to the image output apparatus according to any one of the first to seventh aspects, wherein at least two image output units of the multiple image output units output at least two second images, while shifting, by a predetermined level of precision, positions to which the at least two image output units output the second images.

With this configuration, an image output apparatus in which a wide-band image can be output in a narrow band is provided.

Furthermore, a ninth aspect of the present invention is directed to the image output apparatus according to any one of the first to eighth aspects, wherein at least one image output unit of the multiple image output units includes: an image processing part that generates a second image having a number of pixels that is smaller than that of the first image and having a resolution that is higher than that of the first image, using part of the first image; and an image output part that outputs the second image generated by the image processing part.

With this configuration, an image output apparatus in which a wide-band image can be output in a narrow band is provided.

Furthermore, a tenth aspect of the present invention is directed to the image output apparatus according to the first aspect, further including one or at least two drive units in association with at least one image output unit of the multiple image output units, the drive units being capable of changing a position of the image output unit.

With this configuration, an image output apparatus in which a wide-band image can be output in a narrow band is provided.

Furthermore, an eleventh aspect of the present invention is directed to the image output apparatus according to any one of the second to ninth aspects, wherein the control unit determines a position of at least one image output unit of the multiple image output units, and the image output apparatus further includes one or at least two drive units in association with the at least one image output unit of the multiple image output units, the drive units changing the position of the image output unit according to the determined position.

With this configuration, an image output apparatus in which a wide-band image can be output in a narrow band is provided.

Advantageous Effects of Invention

With the image output apparatus according to the present invention, an image output apparatus in which a wide-band image can be output in a narrow band is provided.

Furthermore, with the image output apparatus according to the present invention, in the case of outputting a wide-band image, the wide-band image can be output in a narrow band without changing the processing clock of an input image to a clock having a high frequency.

DESCRIPTION OF EMBODIMENT

Figure 1:
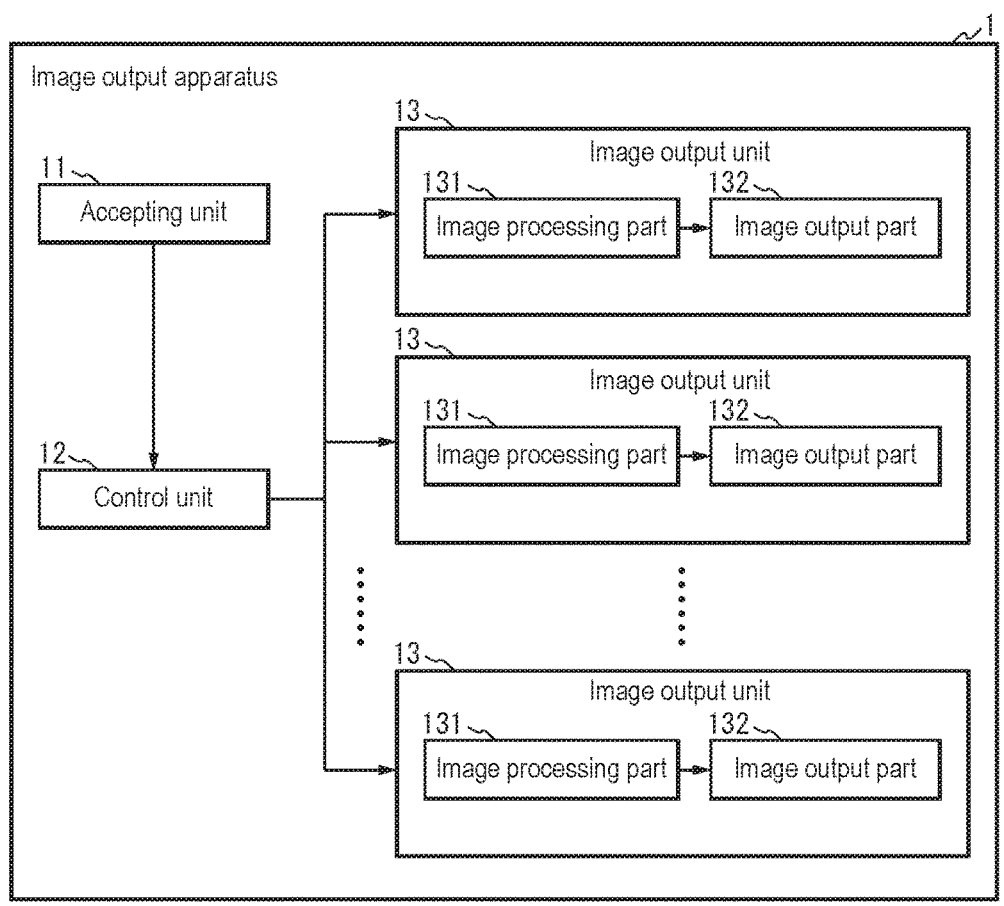
FIG. 1 is a block diagram of an image output apparatus 1 in Embodiment 1.

Hereinafter, an embodiment of an image output apparatus and the like will be described with reference to the drawings. It should be noted that constituent elements denoted by the same reference numerals in the embodiment perform similar operations, and thus a description thereof may not be repeated.

Embodiment 1

In this embodiment, an image output apparatus including multiple image output units that accept a first image of a first band and output second images of a second band will be described. A third image obtained as a result of output by the multiple image output units is an image of a third band. Note that the second band is a band that is narrower than or equal to the first band. Furthermore, the third band is a band that is wider than the first band. That is to say, these three bands have a relationship "second band first band <third band".

Furthermore, in this embodiment, an image output apparatus in which a control unit determines an image that is to be given to each of the multiple image output units, and each of the multiple image output units outputs the determined image will be described.

Furthermore, in this embodiment, an image output apparatus in which image output units, for example, optically output second images will be described. In this embodiment, an image output apparatus in which the output method of second images by two or more image output units is devised, as in the case where images output from two or more image output units at least partially overlap each other, the case where output positions of some of image output units are shifted by a predetermined level of precision, or the like will be described.

Furthermore, in this embodiment, an image output apparatus having a mechanism for performing image processing such as resolution creation on images, in association with each image output unit, will be described.

Furthermore, in this embodiment, an image output apparatus including drive units that can move positions of image output units will be described. The drive units may be manually moved, or may be moved by a control unit.

Furthermore, in this embodiment, an image output apparatus for outputting a third image, which is an image subjected to output control so as to have a band that is wider in terms of space, time, or gradation than that of the first image accepted in the first band, will be described.

Furthermore, in this embodiment, an image output apparatus in which an accepted image can be subjected to output control so as to be zoomed, panned, tilted, or output in slow motion, or have an increased number of gradation levels will be described.

FIG. 1 is a block diagram of an image output apparatus 1 in this embodiment. The image output apparatus 1 includes an accepting unit 11, a control unit 12, and multiple image output units 13. Each of the image output units 13 includes an image processing part 131 and an image output part 132. Note that the image output units 13 may have no image processing part 131.

The accepting unit 11 constituting the image output apparatus 1 accepts first-image information. The first-image information is information related to a first image of a first band. The first-image information may be a first image, or may be a first-image trigger signal or the like. The first image is, for example, a high-definition image, a 4K image, an 8K image, or the like. An image such as the first image is typically video having two or more still images. Note that an image such as the first image may be a still image. The first-image trigger signal is information acquired from the first-image information, and is obtained by extracting significant information from the first image. The first-image trigger signal is, for example, information obtained by compressing the first image, information obtained by sub-sampling the first image, or the like. The band typically has the same meaning as an information amount. That is to say, a wide-band image is typically an image having a large information amount. A narrow-band image is typically an image having a small information amount. The band may be referred to as a data size. Note that processing in which accepted first-image information (e.g., a 4K image) is converted into an HD-band trigger signal is described in Japanese Patent Application No. 2012-184921, for example. The accepting unit 11 may be considered to include a receiving part that receives first-image information.

The accepting unit 11 may accept a change instruction to change the positions of the image output units 13. The change instruction typically contains information for specifying a position that is to be changed. The change instruction may have information on an operation or control for changing the position. The change instruction may contain information for specifying an image output unit 13 whose position is to be changed.

The accepting unit 11 may accept an instruction for output control. The instruction for output control is, for example, an instruction to zoom a third image that is to be output, an instruction to pan a third image that is to be output, and an instruction to tilt a third image that is to be output, an instruction to output a third image in slow motion, an instruction to extend the gradation of part of a third image, or the like. The panning is a videographic technique for rotating a camera in the left-right direction, and the instruction to pan a third image is an instruction to output a third image such that it is an image obtained by rotating a camera in the left-right direction. The tilting is a videographic technique for rotating a camera in the up-down direction, and the instruction to tilt a third image is an instruction to output a third image such that it is an image obtained by rotating a camera in the up-down direction. Furthermore, an instruction to extend the gradation of part of a third image is an instruction to extend the gradation of part of pixels forming an input image and output the image, thereby obtaining a third image. Note that the accepting unit 11 may be considered to include an instruction accepting part that accepts instructions such as the above-described change instruction, instruction for output control, and the like.

Furthermore, the accepting is a concept that encompasses receiving images or the like transmitted via a wired or wireless communication line, receiving broadcasted images or the like, accepting information read from a storage medium such as an optical disk, a magnetic disk, or a semiconductor memory, accepting information input from an input device such as a keyboard, a mouse, or a touch pane, and the like.

The accepting unit 11 may be realized by a wired or wireless communication part, a broadcast receiving part, or the like. The accepting unit 11 may be realized by a device driver for an input part such as a keyboard or a remote controller, or control software for a menu screen, for example.

The control unit 12 determines information that is to be given to each of the multiple image output units 13. The information is an image, a trigger signal, or the like. For example, the control unit 12 determines an image that is to be given to each of the multiple image output units 13, the image using the first-image information accepted by the accepting unit 11. The control unit 12 determines an image that is to be given to each of the multiple image output units 13 such that the third image obtained as a result of output of the second images by the multiple image output units 13 becomes an image supposed in advance. Note that the image using the first-image information is, for example, a partial image of the first image.

The control unit 12 determines, for example, an image that is to be given to each of the multiple image output units 13 in order that part of the first image accepted by the accepting unit 11 might be given to each of the multiple image output units 13. For example, the control unit 12 divides the first image accepted by the accepting unit 11, and gives the obtained two or more first divided images to the multiple image output units 13.

For example, if an image output unit 13 outputs a spatially partial area of the third image, the control unit 12 extracts a first image corresponding to that region, and gives the thus obtained first divided image to that image output unit 13.

The control unit 12 may perform predetermined processing on the first-image information accepted by the accepting unit 11. The predetermined processing is, for example, processing for acquiring a trigger signal from the first-image information accepted by the accepting unit 11. For example, the first-image information accepted by the accepting unit 11 is a 4K image, an 8K image, or the like, and the control unit 12 acquires, for example, an HD-band trigger signal from the first-image information.

For example, the control unit 12 instructs drive units 14 to change the positions, the directions, or the positions and the directions of the image output units 13, according to the change instruction accepted by the accepting unit 11. For example, the control unit 12 instructs the drive units 14 to optically manipulate the image output units 13, according to the change instruction accepted by the accepting unit 11. The optically manipulating is, for example, manipulating to perform zoom-in/zoom-out and focus adjustment using zoom lenses attached to the image output units 13, to change the projection positions by changing the orientations of mirrors installed in front of the lenses, or the like.

Furthermore, the control unit 12 may instruct the multiple projectors 132 to output the second images while shifting the second images by a predetermined level of precision. The predetermined level of precision is typically a shift amount smaller than one pixel, but may also be a shift amount corresponding to precision of non-integer pixels equal to or larger than one pixel, such as 1.5 pixels or 2.8 pixels.

Furthermore, the control unit 12 instructs the image output units 13 to output the second images, according to the instruction for output control accepted by the accepting unit 11.

If the instruction for output control accepted by the accepting unit 11 is a zoom instruction, the control unit 12 acquires information related to second images that are to be output, respectively for the multiple image output units 13, according to zoom region information contained in the instruction for output control, and gives the acquired information to the image output units 13.

Furthermore, if the instruction for output control accepted by the accepting unit 11 is a panning or tilting instruction, the control unit 12 acquires information related to second images that are to be output, respectively for the multiple image output units 13, according to an information group of panning or tilting positions or information on panning or tilting movement contained in the instruction for output control, and gives the acquired information to the image output units 13.

Furthermore, if the instruction for output control accepted by the accepting unit 11 is a slow motion instruction, the control unit 12 instructs the multiple image output units 13 to output the second images at a speed according to information indicating the degree of slow motion contained in the instruction.

Furthermore, the control unit 12 may instruct the drive units 14 to change the positions and the directions of the image output units 13, according to the instruction for output control accepted by the accepting unit 11. It will be appreciated that, for example, the position change instructions issued by the drive units 14 to the image output units 13 differ between the case in which the instruction for output control is a zoom instruction and the case in which the instruction for output control is a slow motion instruction.

The control unit 12 may be realized typically by an MPU, a memory, or the like. Typically, the processing procedure of the control unit 12 is realized by software, and the software is stored in a storage medium such as a ROM. Note that the processing procedure may also be realized by hardware (a dedicated circuit).

Each of the multiple image output units 13 outputs a second image. The second image is, for example, an image of a partial region of the first image corresponding to the first-image information. Alternatively, the second image is, for example, an image at a partial time of the first image corresponding to the first-image information.

For example, the image output units 13 optically output the second images. The image output units 13 output, for example, the second images by printing. Note that the second images are images of a second band that is narrower than or equal to the first band. Typically, all of the multiple image output units 13 output the second images. However, among the multiple image output units 13, part of the image output units 13 may not output the second images. Among the multiple image output units 13, there may be image output units 13 that are not operating. Among the multiple image output units 13, part of the image output units 13 may not temporarily output the second images.

The image output units 13 output the second images, using the first-image information. The multiple image output units 13 output the second images, using the information determined by the control unit 12. The information determined by the control unit 12 is information related to the first-image information. The information determined by the control unit 12 is, for example, information constituted by part of the first-image information.

Furthermore, the multiple image output units 13 may output the second images that are images given from the control unit 12.

Furthermore, one image obtained as a result of output by the multiple image output units 13 is a third image. The third image is an image of a third band that is wider than the first band. The third image may be an image subjected to output control so as to have a band that is wider than that of the first image in terms of at least any one of space, time, and gradation. The output control is control for outputting a zoomed, panned, or tilted image, control for outputting an image in slow motion, control for outputting an image having a higher frame rate, control for outputting an image having more gradation levels than the first image, for the like.

The third band is, for example, a band that is wider than the first band in terms of space. That is to say, for example, the number of pixels of the third image of the third band is larger than that of the first image of the first band. For example, the first image has an HD resolution (1920 pixels× 1080 pixels), whereas the third image has an 8K resolution (7680 pixels×4320 pixels).

Furthermore, the third band is, for example, a band that is wider than the first band in terms of time. That is to say, for example, the first image of the first band is an image having a temporal resolution of 30 Hz or 60 Hz, whereas the third image of the third band is an image having a temporal resolution of 120 Hz or 240 Hz. For example, if the first image of the first band is an image at 60 Hz and an image having a temporal resolution that is four times as high as that of the first image can be created by output of the second images by the multiple image output units 13, the control unit 12 may instruct the multiple image output units 13 to output the second images in order to realize a third image at 240 Hz and at an equal speed, and the multiple image output units 13 may realize a higher frame rate according to the instruction. Also, for example, if the first image of the first band is an image at 60 Hz and an image having a temporal resolution that is four times as high as that of the first image can be created by output of the second images by the multiple image output units 13, the control unit 12 may instruct the multiple image output units 13 to output the second images in order to realize a third image at 60 Hz and at ¼ times speed, and the multiple image output units 13 may output the second images according to the instruction, thereby outputting the third image in slow motion.

Furthermore, the third band is, for example, a band that is wider than the first band in terms of gradation. That is to say, for example, the first image of the first band is an image having 4-bit or 8-bit gradation, whereas the third image of the third band is an image having 16-bit or 32-bit gradation.

Furthermore, the output of the multiple second images is, for example, optical output and analog output, the third image obtained as an ultimate result of output is also an analog image. The third image is, for example, output equivalent to that in the case where digital information having a spatial resolution of 16K, a temporal resolution of 240 Hz, a 16-bit gradation, etc. is optically output. That is to say, the third image may be referred to as an image having a third band that is wider than the first band. Note that the analog output is a continuous output that is not discrete.

The output is a concept that encompasses projection using a projector, printing by a printer, display on a display screen, transmission to an external display apparatus, accumulation in a storage medium, delivery of a processing result to another processing apparatus or another program, and the like.

Furthermore, the multiple image output units 13 may output the second images while shifting the second images by a predetermined level of precision. "Shifting by a predetermined level of precision" is the same as shifting by a predetermined distance.

The image output units 13 may be realized, for example by, projectors and driver software therefor, or the like. The image output units 13 may be realized, for example by, printers and driver software therefor, or the like. The image output units 13 may be realized, for example by, output devices such as display screens and driver software therefor, or the like.

The image processing part 131 constituting each image output unit 13 performs predetermined image processing on the first-image information, thereby generating a second image that is to be output. For example, the image processing part 131 generates a second image obtained by increasing the resolution of a partial region of the first image, using the first-image information. It is assumed that the number of pixels of the second image is the same as or smaller than that of the first image. For example, if the first image is HD (1920 pixels×1080 pixels), the image processing part 131 performs processing for doubling the resolution of a region with 960 pixels×540 pixels, which corresponds to ¼ the pixel number of the HD image, thereby generating a second image with 1920 pixels×1080 pixels. The resolution creating technique is a known technique, and thus a detailed description thereof has been omitted. The image processing part 131 may perform, for example, processing other than the resolution creating processing such as processing for removing noise from the first-image information.

The image processing part 131 may be realized typically by an MPU, a memory, or the like. Typically, the processing procedure of the image processing part 131 is realized by software, and the software is stored in a storage medium such as a ROM. Note that the processing procedure may also be realized by hardware (a dedicated circuit).

The image output part 132 outputs the second image generated by the image processing part 131. The image output part 132 may be realized by, for example, a projector. The image output part 132 may be realized by, for example, a printer. In particular, the image output part 132 may be realized by, for example, a toner ejecting unit and its control unit of a printer. The image output part 132 may output a second image given from the control unit 12.

The output is a concept that encompasses projection using a projector, printing by a printer, display on a display screen, transmission to an external display apparatus, accumulation in a storage medium, delivery of a processing result to another processing apparatus or another program, and the like.

The image output part 132 may be considered to include or to not include an output device such as a display screen or a printer. The image output part 132 may be realized by driver software for an output device, a combination of driver software for an output device and the output device, or the like.

Figure 2:
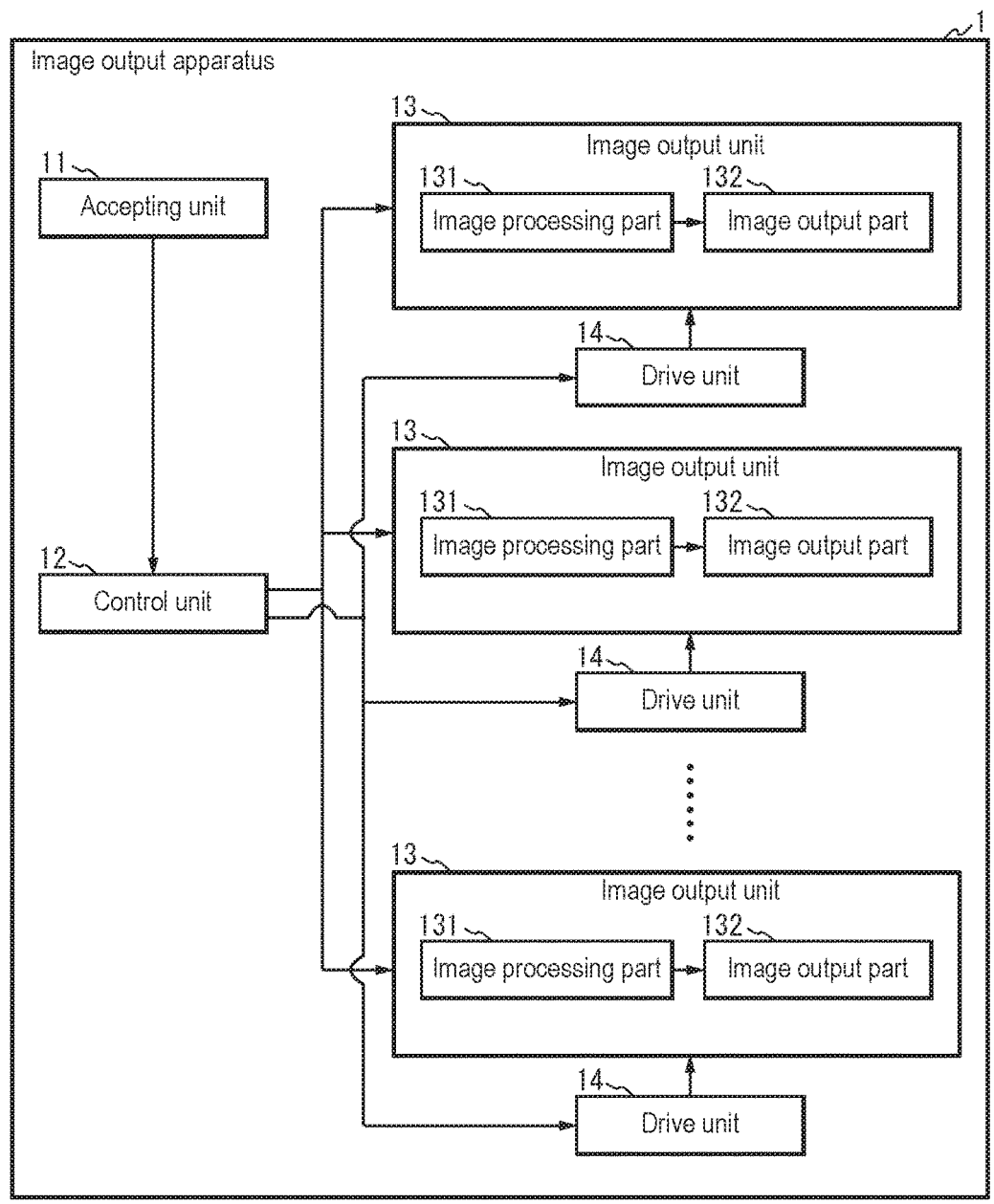
FIG. 2 is a block diagram of the image output apparatus 1 having another configuration in the embodiment.

Note that the image output apparatus 1 may include one or at least two drive units 14 in association with at least one image output unit 13 among the multiple image output units 13. FIG. 2 shows a block diagram of the image output apparatus 1 in this case. The image output apparatus 1 in this case includes the accepting unit 11, the control unit 12, the multiple image output units 13, and one or multiple drive units 14. The drive units 14 are association with the image output units 13. Note that the drive units 14 do not have to be provided in association with all image output units 13. The drive unit 14 may be provided in association with only one image output unit 13. Also, one drive unit may be associated with two or more image output units 13.

Each of the drive units 14 can change the position of the corresponding image output unit 13. The drive unit 14 changes the position of the image output unit 13, according to the position determined by the control unit 12. The drive unit 14 may change the position of the image output unit 13, according to the instruction accepted by the accepting unit 11. The changing the position of the image output unit 13 may be changing the position of the image output part 132.

The drive unit 14 may be realized typically by an actuator. The actuator can change the position of the image output unit 13.

Next, an operation of the image output apparatus 1 will be described with reference to the flowchart in FIG. 3.

(Step S301) The accepting unit 11 determines whether or not it has accepted first-image information, an instruction for output control, or first-image information and an instruction for output control. If first-image information and/or an instruction for output control has been accepted, the procedure advances to step S302, and, if not, the procedure advances to step S310.

(Step S302) The control unit 12 substitutes 1 for a counter i.

(Step S303) The control unit 12 determines whether or not there is an $i^{th}$ image output unit 13. If there is an $i^{th}$ image output unit 13, the procedure advances to step S304, and, if not, the procedure advances to step S301.

(Step S304) The control unit 12 acquires information on the $i^{th}$ image output unit 13. The information on the image output unit 13 is typically held in advance by the control unit 12 in an unshown buffer, but may be acquired from the $i^{th}$ image output unit 13. The information on the image output unit 13 is information related to the position of the image output unit 13, a second image that is to be output, or the like. The information related to a second image that is to be output is, for example, information on the associated region (typically, a rectangular region) in the first-image information.

(Step S305) The control unit 12 determines information that is to be given to the $i^{th}$ image output unit 13, using the instruction for output control and the information on the $i^{th}$ image output unit 13 acquired in step S304. The control unit 12 acquires, for example, a region of an image that is to be given to the $i^{th}$ image output unit 13, in the entire region of the first image, from the instruction for output control and the position of the $i^{th}$ image output unit 13. The information on the region is, for example, the information $(x_1, y_1)$ $(x_2, y_2)$, and is information for specifying a rectangular region. For example, $(x_1, y_1)$ indicates the coordinates of the upper left point of the rectangle, and $(x_2, y_2)$ indicates the coordinates of the lower right point of the rectangle.

Note that, if no instruction for output control is accepted in step S301, the control unit 12 may determine information that is to be given to the $i^{-th}$ image output unit 13, using the information on the $i^{-th}$ image output unit 13 acquired in step S304.

(Step S306) The control unit 12 acquires the information determined in step S305, using the first-image information.

(Step S307) The image processing part 131 constituting the $i^{-th}$ image output unit 13 performs predetermined image processing on the information (typically, an image) acquired in step S306, thereby generating a second image that is to be output. Note that, even in the case where the information acquired in step S306 is not an image, it is information related to an image. It is assumed that the predetermined processing on the information related to an image is referred to as image processing.

(Step S308) The image output part 132 constituting the $i^{-th}$ image output unit 13 outputs the second image generated in step S307 by the image processing part 131.

(Step S309) The control unit 12 increments the counter i by 1. The procedure returns to step S303.

(Step S310) The accepting unit 11 determines whether or not it has accepted a change instruction. If a change instruction has been accepted, the procedure advances to step S311, and, if not, the procedure returns to step S301.

(Step S311) The control unit 12 instructs one or at least two drive units 14 to change the positions, according to the change instruction accepted in step S310.

(Step S312) The drive units 14 change the positions of the image output units 13, according to the instruction in step S311. The procedure returns to step S301. The drive units 14 may change the positions of all image output units 13, or may change the positions of only image output units 13 indicated by the change instruction.

Figure 3:
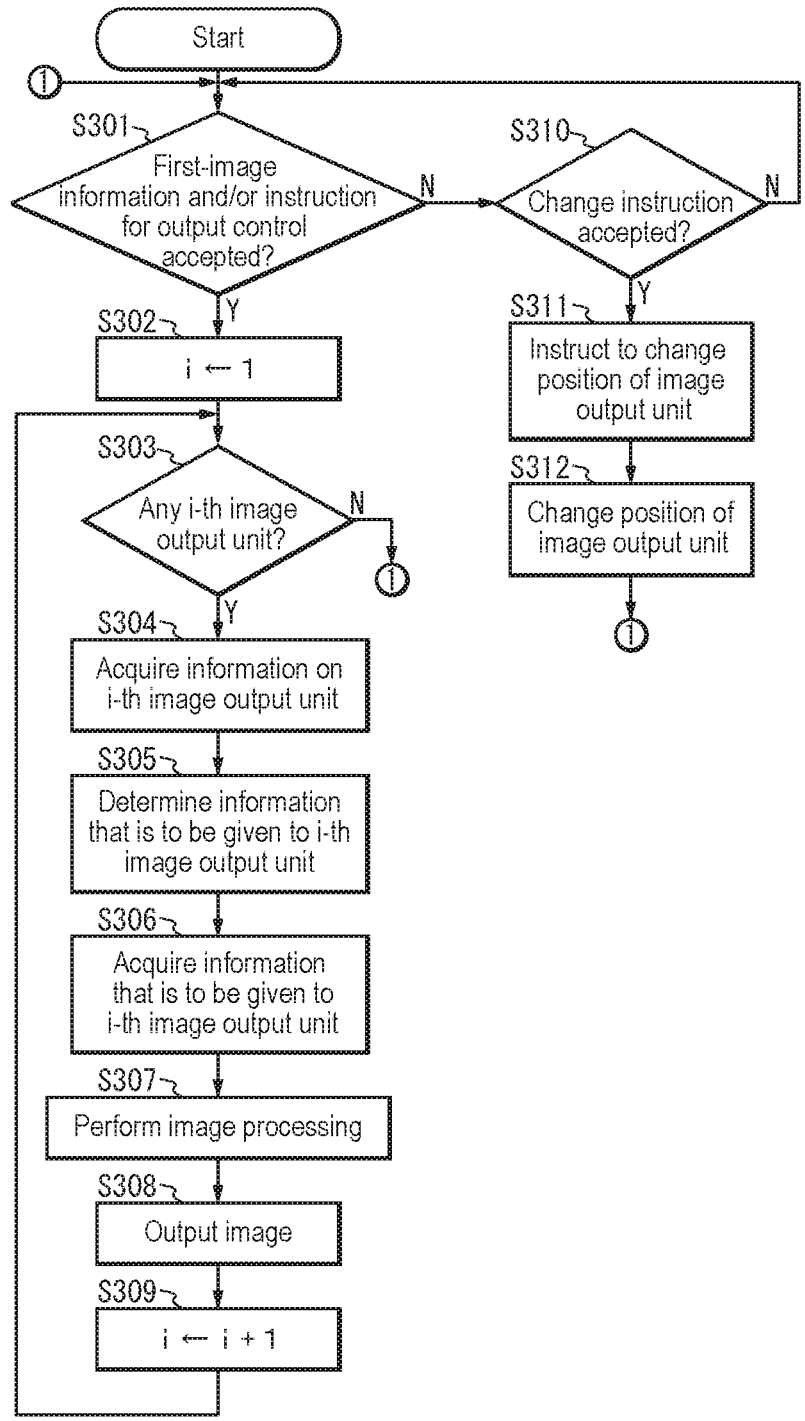
FIG. 3 is a flowchart illustrating an operation of the image output apparatus 1 in the embodiment.

It will be appreciated that, in the flowchart in FIG. 3, the processes of the multiple image output units 13 may be performed in parallel. In this case, the processes in steps S304 to S306 are performed before the processes of the multiple image output units 13.

Furthermore, in the flowchart in FIG. 3, the positions of the image output units 13 are changed according to the instruction accepted by the accepting unit 11. However, the drive units 14 may change the positions of the image output units 13, according to the positions determined by the control unit 12.

For example, if part of the first image has a high luminance portion, the positions of the image output units 13 are changed such that the image output units 13 are allocated so as to be concentrated on that portion.

For example, if one of the image output units 13 is broken, the positions of the other image output units 13 are changed so as to make up for that broken image output unit 13.

Furthermore, in the flowchart in FIG. 3, the image processing parts 131 may not operate, and the image output parts 132 may output second images that are information given from the control unit 12.

Note that the procedure is terminated by powering off or an interruption at the end of the process in the flowchart in FIG. 3.

Hereinafter, specific operations of the image output apparatus 1 in this embodiment will be described. In the examples below, the image output apparatus 1 includes multiple projectors. The projector correspond to the image output parts 132 of the image output units 13.

Hereinafter, 21 specific examples will be described. Specific Examples 1 to 3 are specific examples for illustrating variations of bands of the first image, the second images, and the third image. Specific Examples 4 to 8 are specific examples in which the image output units 13 have the projectors 132, for illustrating variations of projector positions. Specific Examples 9 to 13 are specific examples in which the image output units 13 have the projectors 132, and optical output is controlled by moving the positions of the projectors or optical devices (typically, mirrors) using the drive units 14 or the like. Specific Examples 14 to 17 are specific examples in which the output method of the second images by the image output units 13 is devised to output a third image of a third band, which is a band that is wider than the first band.

Specific Examples 18 to 21 are specific examples in which an instruction for output control is accepted and a third image subjected to value creation is output.

SPECIFIC EXAMPLE 1

Specific Example 1 shows a case in which first-image information, which is information related to an input image, is a high-definition (hereinafter, also referred to as "HD") image, and a third image, which is an output image, is a 16K image.

Figure 4:
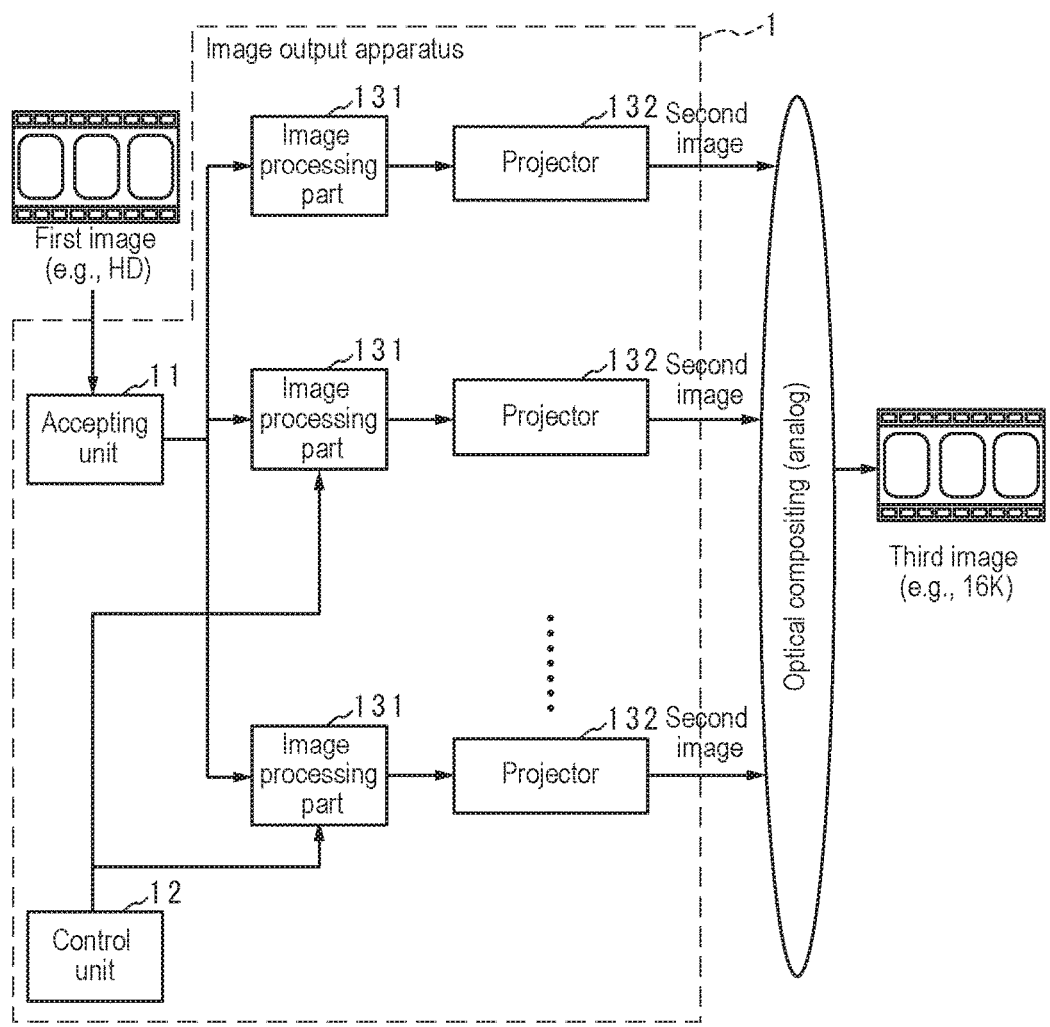
FIG. 4 is a block diagram of a specific example of the image output apparatus 1 in the embodiment.

In Specific Example 1, the image output parts 132 respectively constituting the image output units 13 are projectors. FIG. 4 shows a block diagram of the image output apparatus 1 in Specific Example 1. In FIG. 4, the accepting unit 11 accepts first-image information that is an HD image. Next, the control unit 12 acquires information on each of the two or more image processing parts 131, from an unshown buffer. The unshown buffer is, for example, a buffer held by the control unit 12. The information on each image processing part 131 is, for example, an identifier of the image processing part 131, information indicating a position where the image processing part 131 is installed, information indicating a region of an image that is to be projected by the image processing part 131, or the like. The information on each image processing part 131 is information for specifying an image or a trigger signal used by the image processing part 131 for output, and may be referred to as specifying information, as appropriate.

Next, the control unit 12 determines information that is to be given to each of the two or more image processing parts 131, using the specifying information corresponding thereto. It is assumed that the information that is to be given to each of the image processing parts 131 is an image of a partial spatial region of the input HD image.

Next, the control unit 12 acquires, for each image processing part 131, an image of a partial spatial region of the HD image that is the determined information, from the first image, and gives it to the image processing part 131.

Next, each of the two or more image processing parts 131 performs predetermined image processing (e.g., resolution creating processing, noise removing processing, etc.) on the given image, thereby generating a second image that is to be output. The two or more image output parts 132 optically output the second images respectively generated by the image processing parts 131.

The multiple second images respectively output by the multiple image output parts 132 are subjected to optical compositing on an image projection screen, so that a third image, which is an output image, is displayed on the screen. The third image is, for example, an image having 16K spatial resolution. Note that the screen may be a wall of a room or the like.

Figure 5:
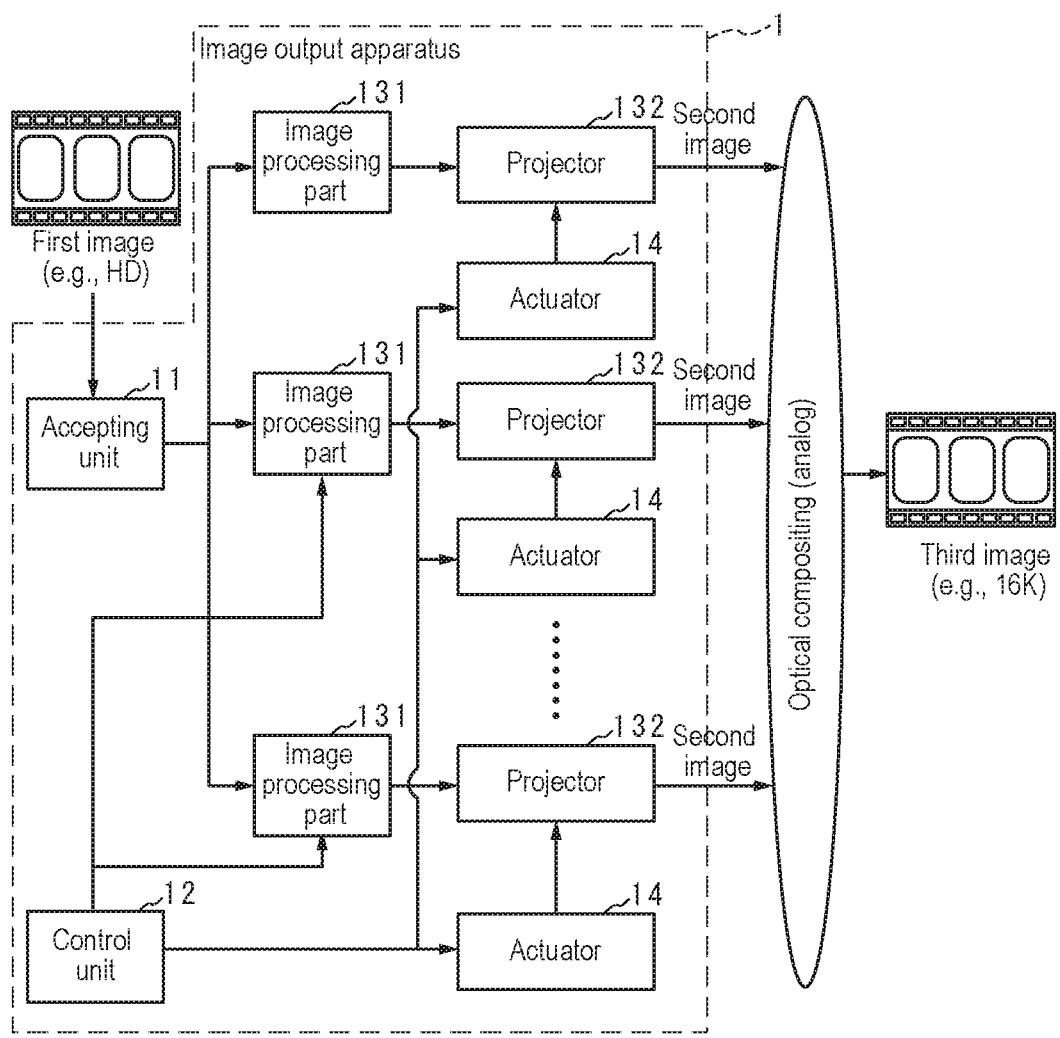
FIG. 5 is a block diagram of a specific example of the image output apparatus 1 in the embodiment.

Note that, in FIG. 4, the image output apparatus 1 does not include the drive units 14, but may include the drive units 14. FIG. 5 is a block diagram in this case. If the image output apparatus 1 includes the drive units 14, for example, the control unit 12 instructs the drive units 14 to control the positions of the projectors 132. Note that the drive units 14 in this case are actuators.

SPECIFIC EXAMPLE 2

Specific Example 2 shows a case in which first-image information, which is information on an input image, is a 4K image, and the accepted 4K image is converted into, for example, an HD-band trigger signal. Then, the control unit 12 gives the trigger signal to each of the multiple image processing parts 131. Next, each of the image processing parts 131 processes the given trigger signal, thereby generating a second image. Next, the multiple image output parts 132 output the second images. A third image, which is an output image displayed by output by the multiple image output parts 132, is a 16K image.

Figure 6:
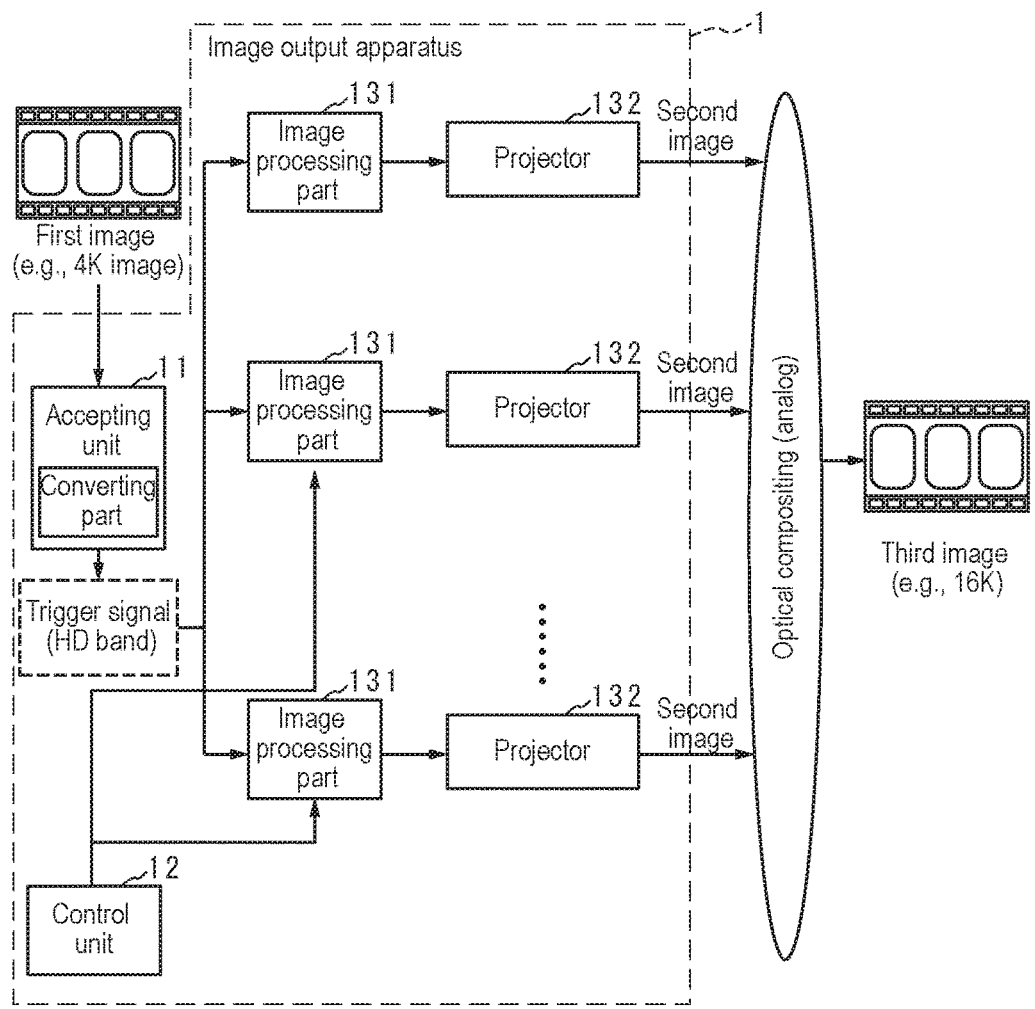
FIG. 6 is a block diagram of a specific example of the image output apparatus 1 in the embodiment.

In Specific Example 2, the image output parts 132 respectively constituting the image output units 13 are projectors. FIG. 6 shows a block diagram of the image output apparatus 1 in Specific Example 2.

In FIG. 6, the first-image information that is an input image is, for example, a 4K image. The accepting unit 11 accepts first-image information that is a 4K image. Next, a converting part provided in the accepting unit 11 converts the 4K image into an HD-band trigger signal. Note that there is no limitation on the converting method.

Next, the control unit 12 acquires two or more pieces of specifying information from an unshown buffer. The two or more pieces of specifying information are information respectively corresponding to the image processing parts 131.

Next, the control unit 12 determines information that is to be given to each of the image processing parts 131, respectively using the two or more pieces of specifying information.

Next, the control unit 12 acquires, for each image processing part 131, a trigger signal corresponding to the determined information, and gives it to the image processing part 131.

Next, each of the two or more image processing parts 131 performs predetermined image processing on the given trigger signal, thereby generating a second image that is to be output. The two or more image output parts 132 optically output the second images respectively generated by the image processing parts 131.

The multiple second images respectively output by the multiple image output parts 132 are subjected to optical compositing on an image projection screen, so that a third image, which is an output image, is displayed on the screen. The third image is, for example, an image having 16K spatial resolution.

Figure 7:
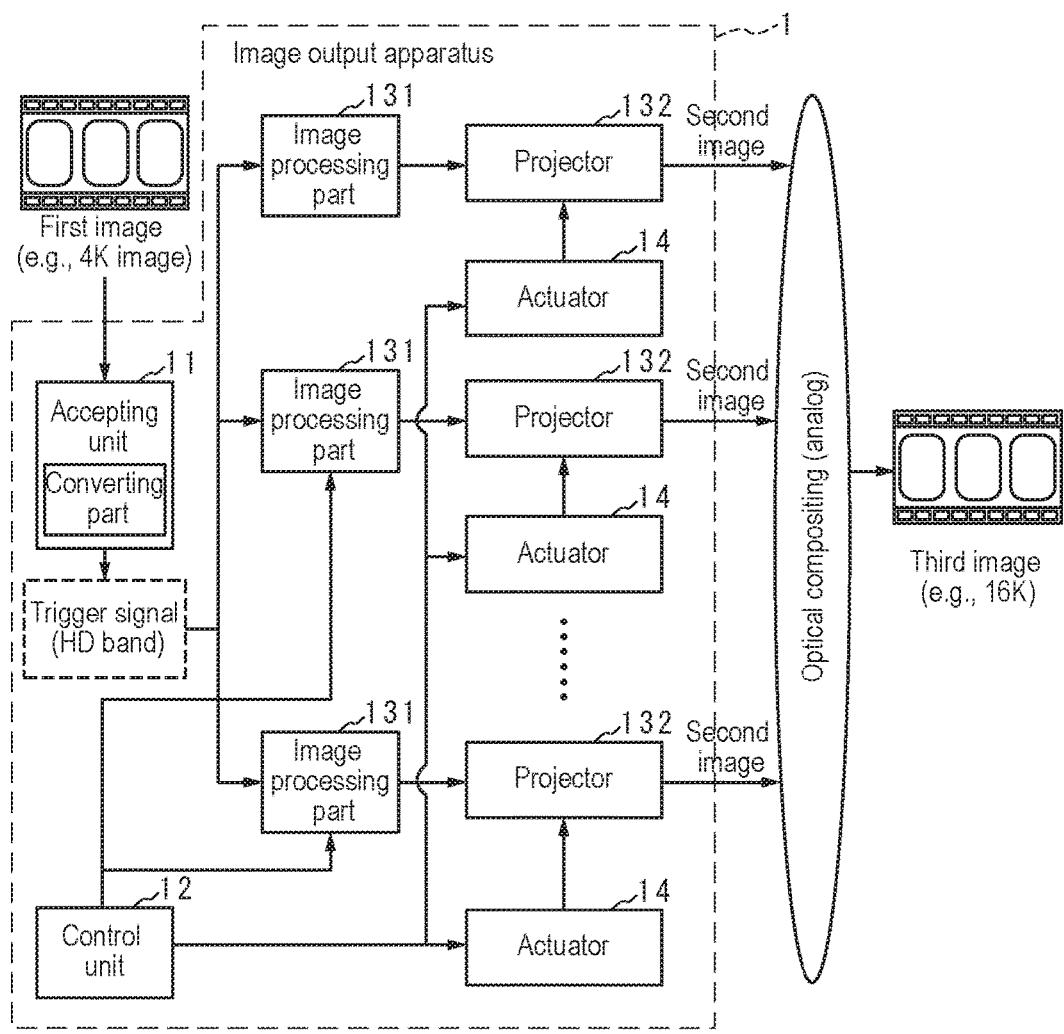
FIG. 7 is a block diagram of a specific example of the image output apparatus 1 in the embodiment.

Note that, in FIG. 6, the image output apparatus 1 does not include the drive units 14, but may include the drive units 14. FIG. 7 is a block diagram in this case. If the image output apparatus 1 includes the drive units 14, for example, the control unit 12 controls the positions of the drive units 14. Note that the drive units 14 in this case are actuators.

SPECIFIC EXAMPLE 3

Specific Example 3 shows a case in which first-image information, which is information on an input image, is, for example, an HD-band trigger signal extracted from a 4K image, and a third image, which is an output image, is a 16K image.

Figure 8:
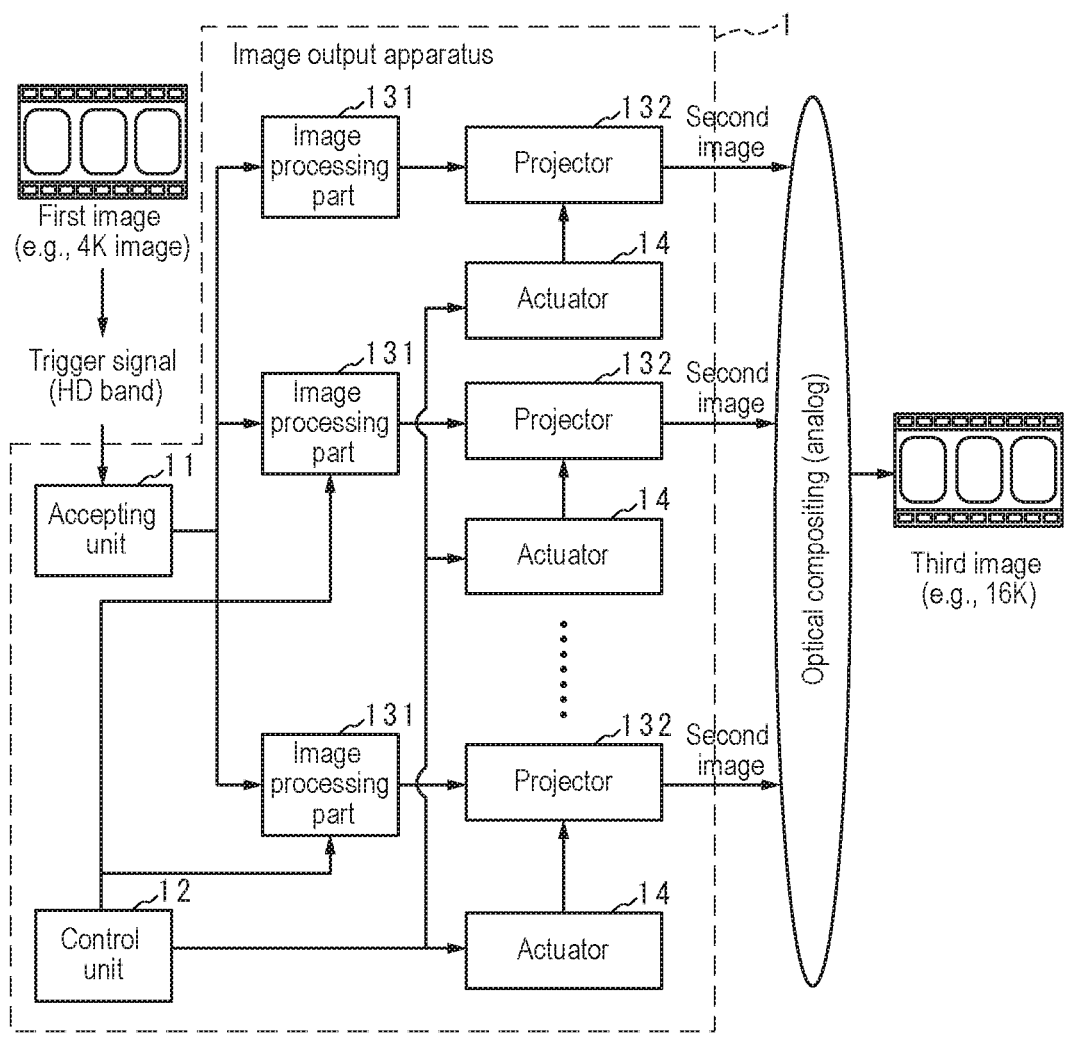
FIG. 8 is a block diagram of a specific example of the image output apparatus 1 in the embodiment.

In Specific Example 2, the processing that extracts an HD-band trigger signal from a 4K image is performed by the image output apparatus 1. However, in Specific Example 3, the processing that extracts an HD-band trigger signal from a 4K image is performed by, for example, a communication apparatus or a broadcast apparatus that transmits information to the image output apparatus 1. FIG. 8 shows a block diagram of the image output apparatus 1 in this case.

An operation of the image output apparatus 1 in Specific Example 3 is as follows. First, the accepting unit 11 accepts an HD-band trigger signal.

Next, the control unit 12 acquires two or more pieces of specifying information from an unshown buffer. The two or more pieces of specifying information are information respectively corresponding to the image processing parts 131.

Next, the control unit 12 determines a trigger signal that is to be given to each of the image processing parts 131, respectively using the two or more pieces of specifying information. The trigger signal that is to be given to each of the image processing parts 131 is typically the whole or part of the trigger signal accepted by the accepting unit 11.

Next, the control unit 12 gives the trigger signal determined for each image processing part 131, to the image processing part 131.

Next, each of the two or more image processing parts 131 performs predetermined image processing on the given trigger signal, thereby generating a second image that is to be output. The two or more image output parts 132 optically output the second images respectively generated by the image processing parts 131.

The multiple second images respectively output by the multiple image output parts 132 are subjected to optical compositing on an image projection screen, so that a third image, which is an output image, is displayed on the screen. The third image is, for example, an image having 16K spatial resolution.

SPECIFIC EXAMPLE 4

Figure 9:
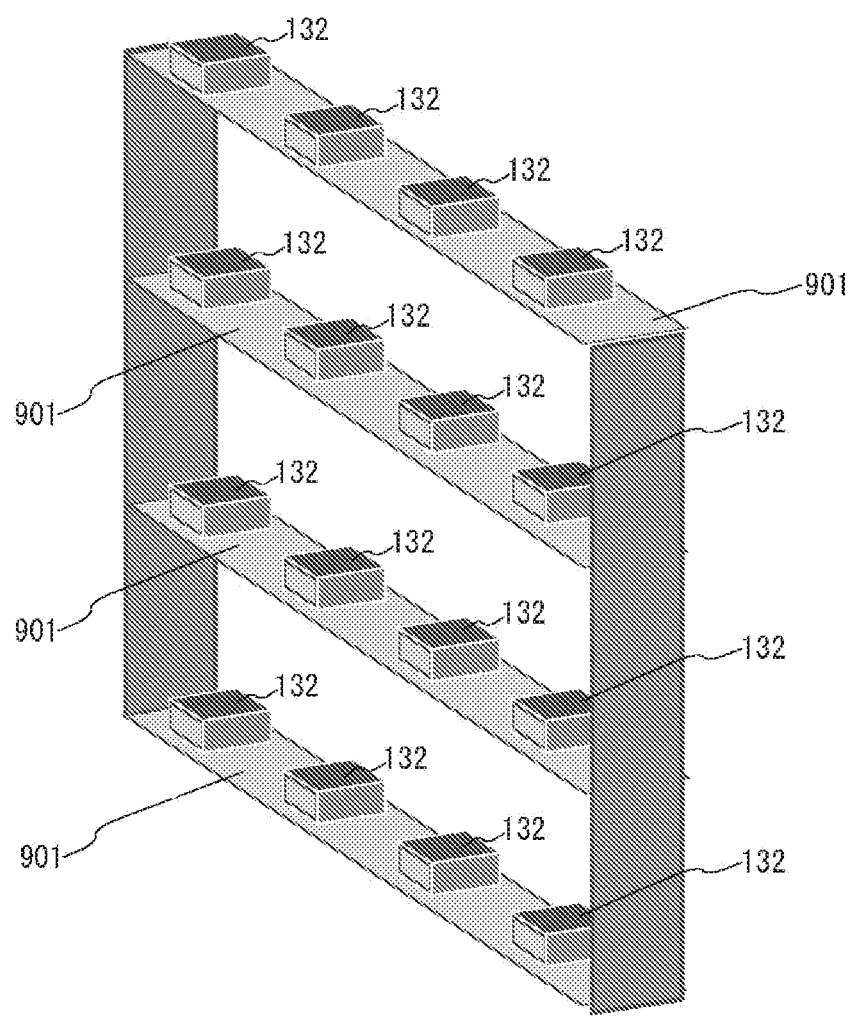
FIG. 9 is a conceptual view of the image output apparatus 1 in which projectors are arranged on movable shelves in the embodiment.
Figure 10:
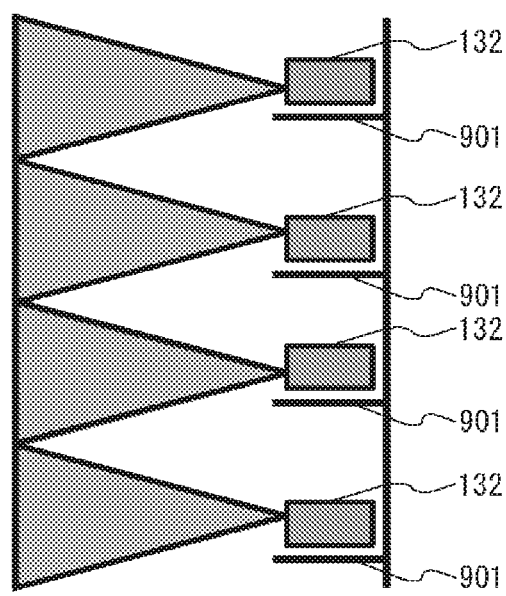
FIG. 10 is a conceptual view of projection areas of multiple projectors in the embodiment.
Figure 11:
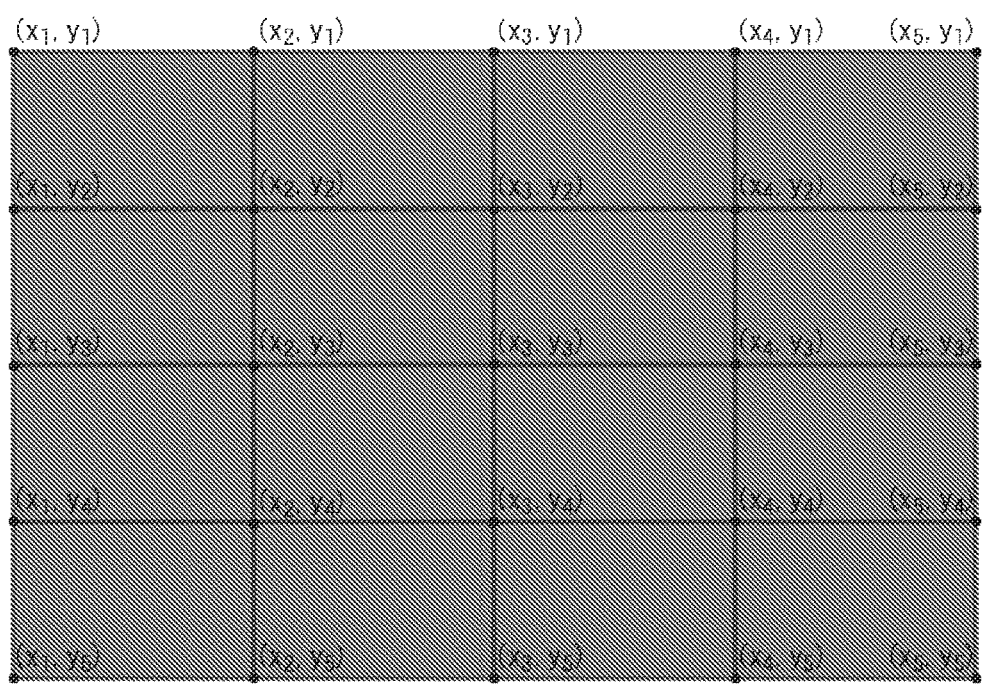
FIG. 11 is a conceptual view of projection areas of multiple projectors in the embodiment.

Specific Example 4 shows a case in which the image output units 13 respectively have the projectors 132, the projectors 132 are installed on shelves 901, and the projection areas of the multiple projectors 132 do not overlap each other. FIG. 9 shows a conceptual view in which the multiple projectors 132 are arranged on the shelves 901. In this case, as shown in FIGS. 10 and 11, the projection areas of multiple projectors do not overlap each other. A block diagram of the image output apparatus 1 in Specific Example 4 is shown, for example, in any one of FIGS. 4 to 8. In Specific Example 4, the image output apparatus 1 has 16 projectors 132, but there is no limitation on the number of projectors 132 provided in the image output apparatus 1.

In Specific Example 4, the control unit 12 holds specifying information in association with each of the image processing parts 131. The specifying information is information for specifying an image that is used in projection by each of the two or more image processing parts 131, or information for specifying a trigger signal that is used in projection by each of the two or more image processing parts 131. The specifying information is, for example, information for specifying a spatial region in the first image accepted by the accepting unit 11, and is, for example, information on two coordinate points (e.g., an upper left coordinate point and a lower right coordinate point) for specifying a rectangle. For example, the specifying information corresponding to each of the two or more image processing parts 131 is information for specifying a rectangular region associated with that image processing part 131, and is coordinate values of two points, in the coordinates shown in FIG. 11. The specifying information may also be an ID or the like of each rectangular region shown in FIG. 11.

The image output apparatus 1 operates as in any one of Specific Examples 1 to 3.

SPECIFIC EXAMPLE 5

Figure 12:
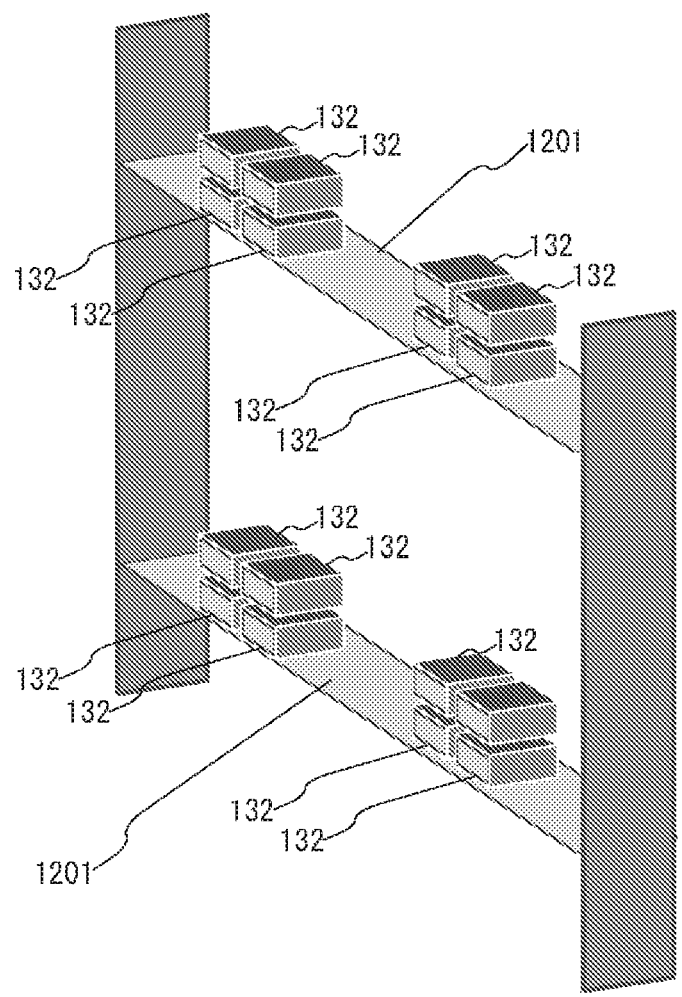
FIG. 12 is a conceptual view in which multiple projectors are arranged on movable shelves in the embodiment.
Figure 13:
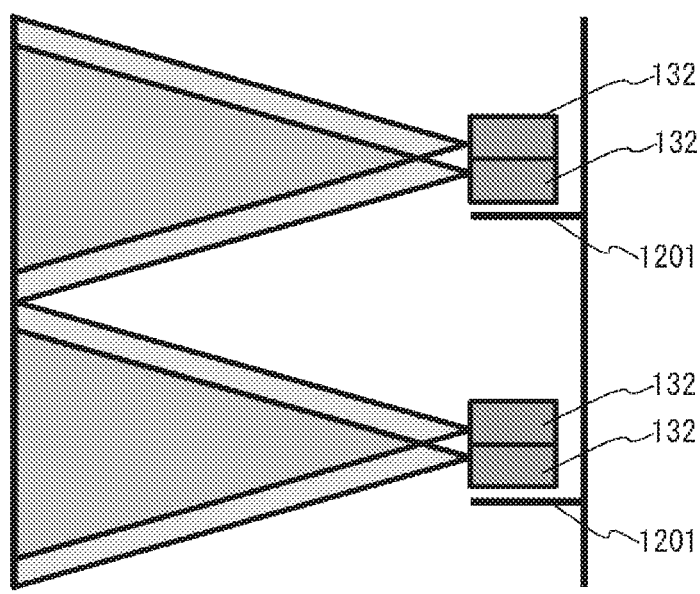
FIG. 13 is a conceptual view of projection areas of multiple projectors in the embodiment.

Specific Example 5 shows a case in which the image output units 13 respectively have the projectors 132, the projectors are installed on shelves 1201, and there are the multiple projectors 132 whose projection areas overlap each other. FIG. 12 shows a conceptual view in Specific Example 5 in which the multiple projectors 132 are arranged on the shelves 1201. In this case, as shown in FIG. 13, the projection areas of multiple projectors overlap each other. A block diagram of the image output apparatus 1 in Specific Example 5 is shown, for example, in any one of FIGS. 4 to 8.

The image output apparatus 1 operates as in any one of Specific Examples 1 to 3.

SPECIFIC EXAMPLE 6

Figure 14:
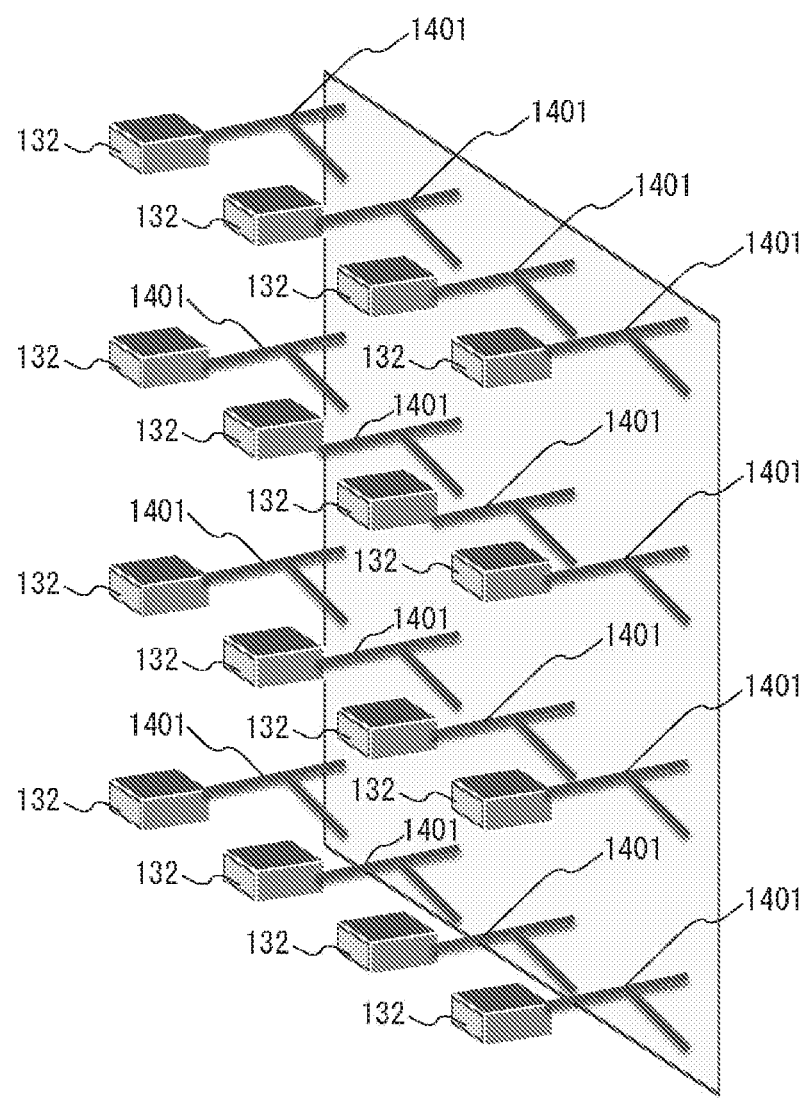
FIG. 14 is a conceptual view of the image output apparatus 1 in which projectors are supported by arms in the embodiment.
Figure 15:
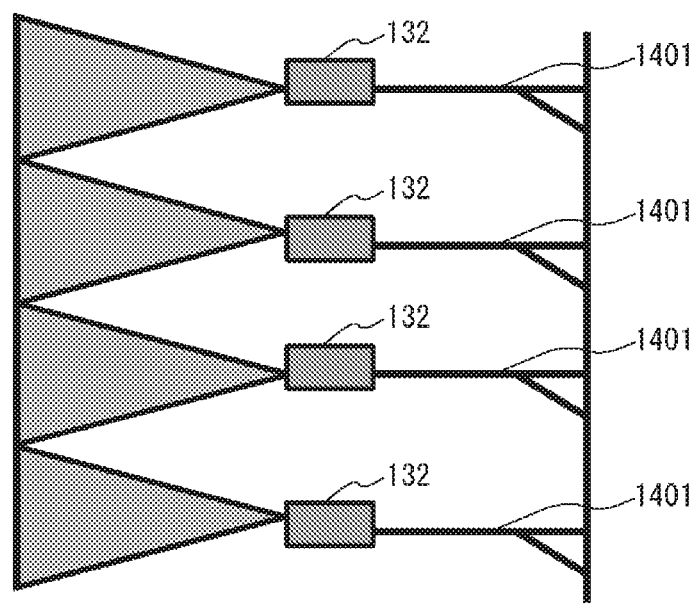
FIG. 15 is a conceptual view of projection areas of multiple projectors in the embodiment.

Specific Example 6 shows a case in which the image output units 13 respectively have the projectors 132, the projectors 132 are arranged so as to be supported by arms 1401, and the projection areas of the multiple projectors 132 do not overlap each other. FIG. 14 shows a conceptual view of the image output apparatus 1 in Specific Example 6. In this case, as shown in FIG. 15, the projection areas of multiple projectors do not overlap each other.

The image output apparatus 1 operates as in any one of Specific Examples 1 to 3, and thus a description thereof will not be repeated. The arms 1401 may be, for example, extendable and retractable. In this case, according to the change instruction accepted by the accepting unit 11, the drive units 14 extend or retract the arms 1401, thereby changing the positions of the projectors 132.

SPECIFIC EXAMPLE 7

Figure 16:
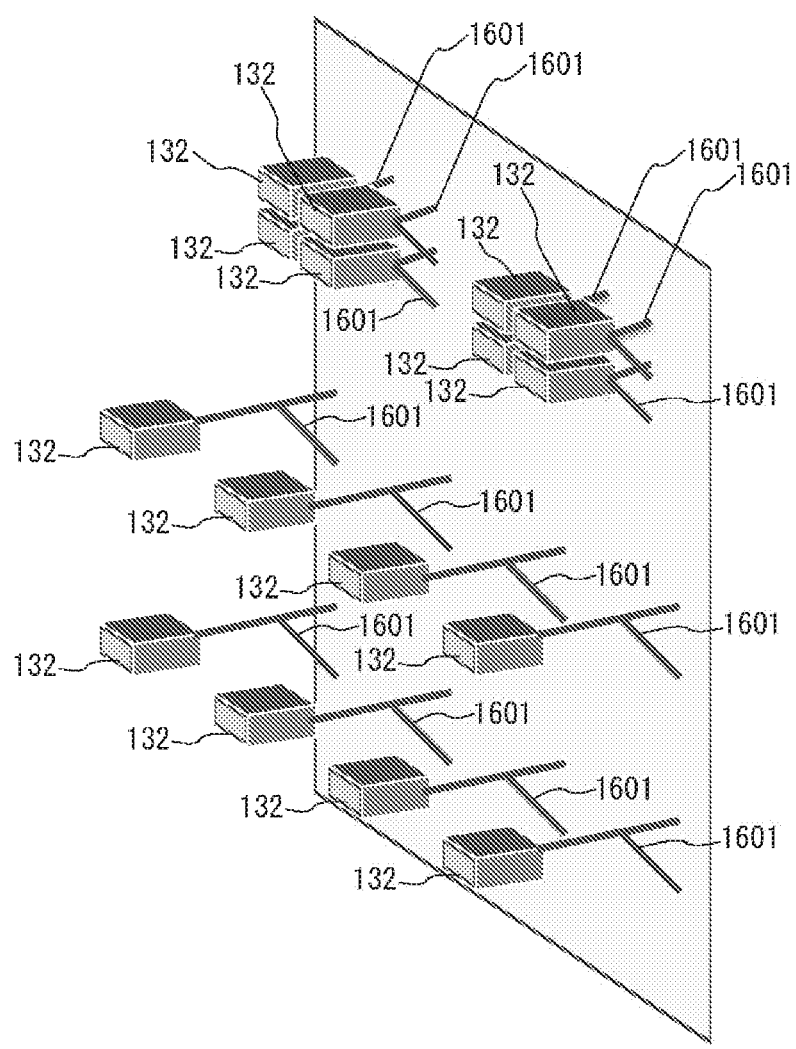
FIG. 16 is a conceptual view of the image output apparatus 1 in which projectors are supported by arms in the embodiment.
Figure 17:
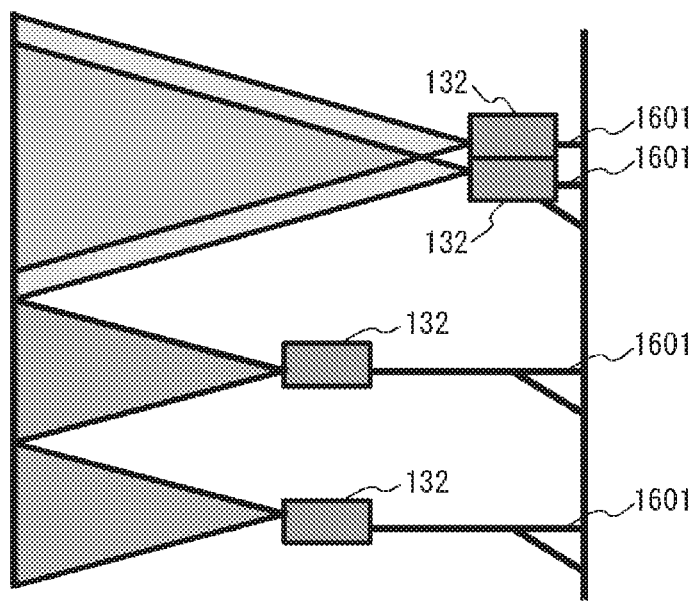
FIG. 17 is a conceptual view of projection areas of multiple projectors in the embodiment.

Specific Example 7 shows a case in which the image output units 13 respectively have the projectors 132, the projectors 132 are arranged so as to be supported by arms 1601, and there are multiple projectors whose projection areas overlap each other. FIG. 16 shows a conceptual view of the image output apparatus 1 in Specific Example 7. In this case, as shown in FIG. 17, some of the multiple projectors 132 have projection areas that overlap each other.

The image output apparatus 1 operates as in any one of Specific Examples 1 to 3, and thus a description thereof will not be repeated. The arms 1601 may be, for example, extendable and retractable. In this case, according to the change instruction accepted by the accepting unit 11, the drive units 14 extend or retract the arms 1601, thereby changing the positions of the projectors 132.

SPECIFIC EXAMPLE 8

Specific Example 8 shows a case in which the image output units 13 respectively have the projectors 132, the projectors 132 are installed on the shelves 901 (see FIG. 9), the projection areas are controlled by controlling the zoom of the projectors, and the projection areas of the multiple projectors 132 do not overlap each other (see FIG. 10).

In Specific Example 8, for example, it is assumed that the user inputs an instruction to control the zoom of the projectors 132, according to the distance between the image output apparatus 1 and the projection surface and the size of the projection surface. The accepting unit 11 accepts the instruction. Next, the control unit 12 controls the zoom of the projectors 132 according to the accepted instruction. The processing for controlling the zoom of the projectors 132 is a known technique, and thus a detailed description thereof has been omitted.

After the processing for controlling the zoom of the projectors 132, the image output apparatus 1 operates as in any one of Specific Examples 1 to 3.

SPECIFIC EXAMPLE 9

Figure 18:
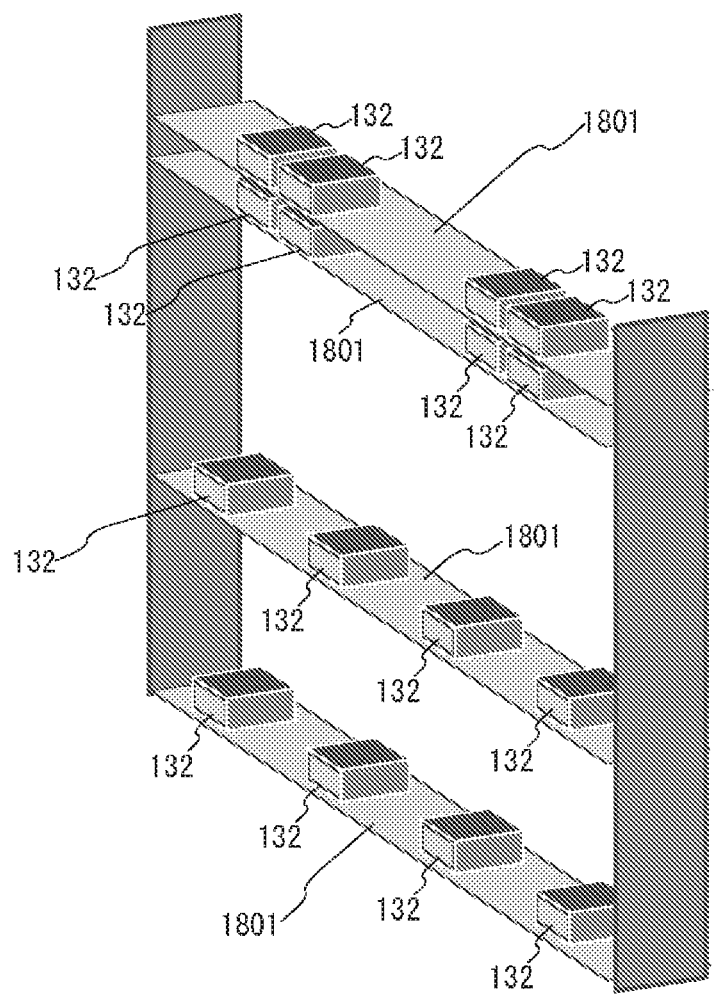
FIG. 18 is a conceptual view of the image output apparatus 1 in which projectors are arranged on movable shelves in the embodiment.
Figure 19:
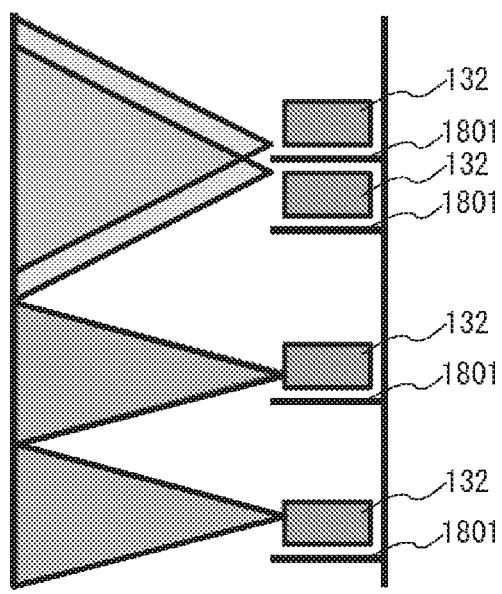
FIG. 19 is a conceptual view of projection areas of multiple projectors in the embodiment.

Specific Example 9 shows a case in which the image output units 13 respectively have the projectors 132, the projectors 132 are installed on shelves 1801, the projection areas are controlled by controlling the zoom of the projectors 132, and there are multiple projectors whose projection areas overlap each other. FIG. 18 shows a conceptual view of the image output apparatus 1 in Specific Example 9. In this case, as shown in FIG. 19, some of the multiple projectors have projection areas that overlap each other. A block diagram of the image output apparatus 1 in Specific Example 9 is shown, for example, in any one of FIGS. 4 to 8.

The image output apparatus 1 operates as in any one of Specific Examples 1 to 3.

SPECIFIC EXAMPLE 10

Figure 20:
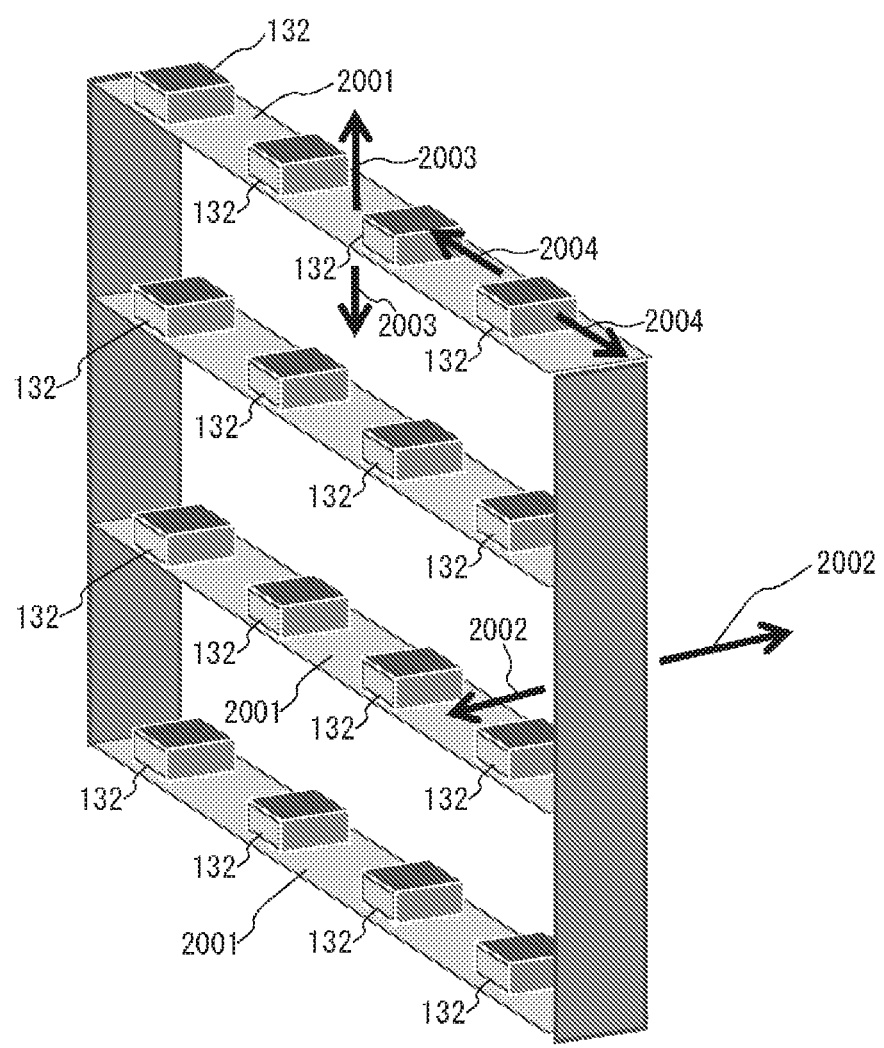
FIG. 20 is a conceptual view of the image output apparatus 1 in which projectors are arranged on movable shelves in the embodiment.

Specific Example 10 shows a case in which the image output units 13 respectively have the projectors 132, the projectors 132 are installed on movable shelves 2001, and the positions of the projectors 132 can be changed by causing the drive units 14 to move the movable shelves 2001. FIG. 20 shows a conceptual view of the image output apparatus 1 in this case.

It is assumed that, in FIG. 20, the movable shelves 2001 can move, for example, in the front-rear direction as indicated by the arrows 2002, in the up-down direction as indicated by the arrows 2003, or in the front-rear direction and the up-down direction. Furthermore, it is assumed that the projectors 132 can move in the left-right direction as indicated by the arrows 2004.

In this situation, it is assumed that the user inputs, for example, a change instruction to move the movable shelves 2001, according to the distance between the image output apparatus 1 and the projection surface and the size of the projection surface. The accepting unit 11 accepts the change instruction. Next, the drive units 14 move the movable shelves 2001 according to the accepted change instruction, thereby changing the positions of the projectors 132. In this case, the change instruction has information indicating the distance by which the movable shelves 2001 are to be moved, the positions to which the movable shelves 2001 are to be moved, the positions of the projectors 132, or the like. The user is, for example, a person who performs maintenance of the image output apparatus 1. The projection surface is a screen, a wall, or the like on which the third image is displayed.

After the movable shelves 2001 are moved, the image output apparatus 1 operates as in any one of Specific Examples 1 to 3.

It will be appreciated that the thus configured image output apparatus 1 can control the positions of the projectors 132 to realize the arrangement as shown in FIGS. 9 and 10 (see Specific Example 4), the arrangement as shown in FIGS. 12 and 13 (see Specific Example 5), the arrangement as shown in FIGS. 18 and 19 (see Specific Example 9), and the like.

SPECIFIC EXAMPLE 11

Figure 21:
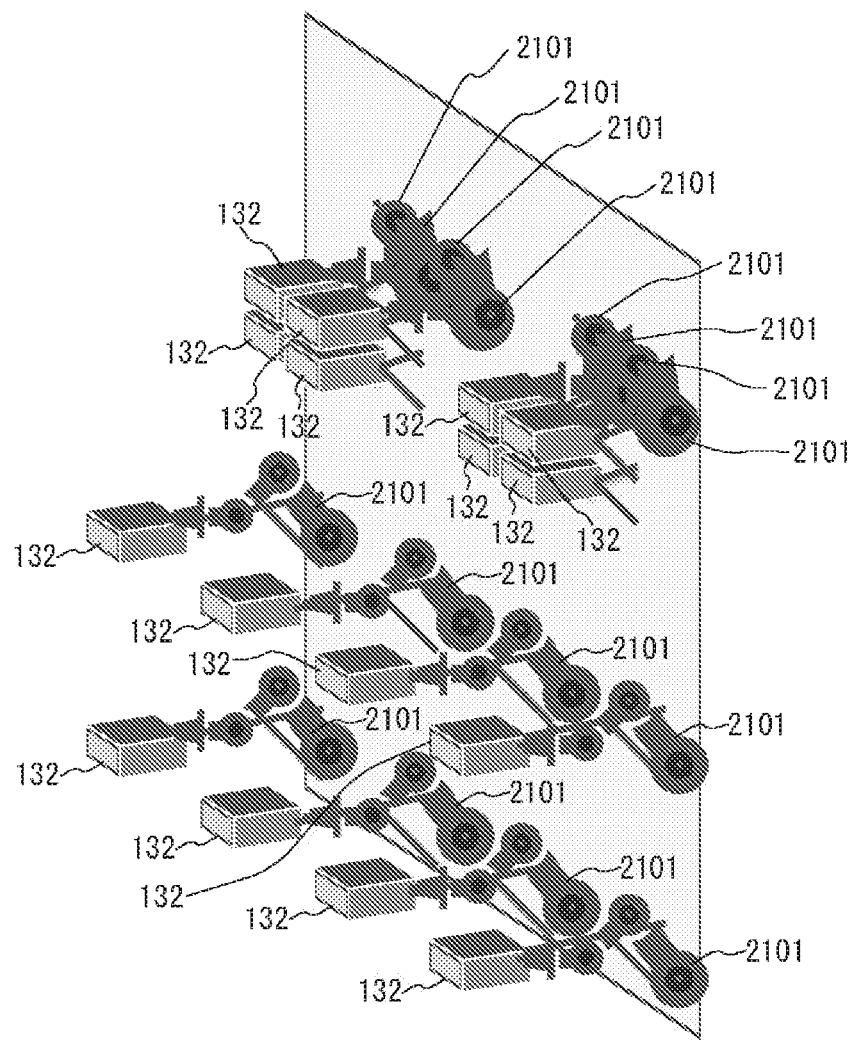
FIG. 21 is a conceptual view of the image output apparatus 1 in which projectors are supported by robot arms in the embodiment.
Figure 22:
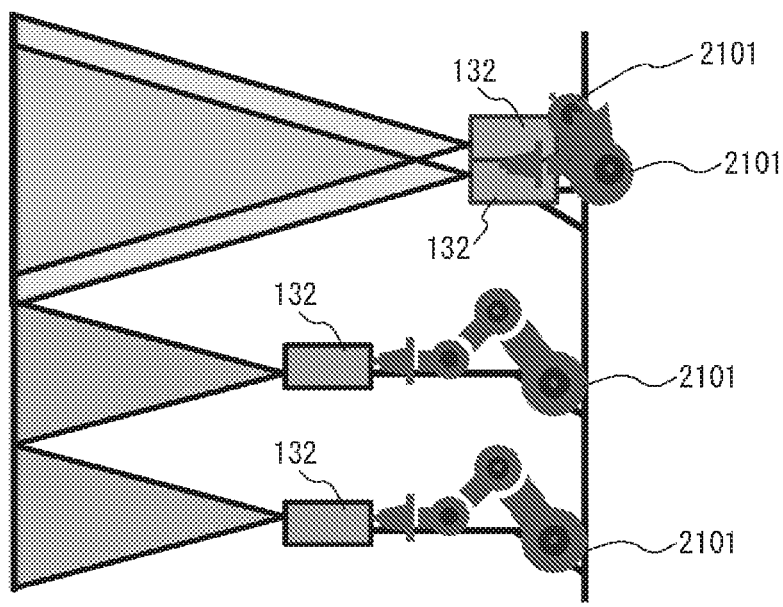
FIG. 22 is a conceptual view of projection areas of multiple projectors in the embodiment.

Specific Example 11 shows a case in which the image output units 13 respectively have the projectors 132, the projectors 132 are installed so as to be supported by robot arms 2101, and the positions of the projectors 132 can be changed by the drive units 14 including the robot arms 2101 (see FIG. 21). Specific Example 11 shows the case in which some of the projectors 132 have projection areas that overlap each other (see FIG. 22).

In Specific Example 11, it is assumed that the user inputs, for example, a change instruction to extend or retract the robot arms 2101, according to the distance between the image output apparatus 1 and the projection surface and the size of the projection surface. The accepting unit 11 accepts the change instruction. Next, the drive units 14 move the robot arms 2101 according to the accepted change instruction, thereby changing the positions of the projectors 132.

After the robot arms 2101 are moved, the image output apparatus 1 operates as in any one of Specific Examples 1 to 3.

It will be appreciated that the positions of the projectors 132 can be controlled to realize, for example, the arrangement as shown in FIGS. 14 and 15 (see Specific Example 6), by controlling the robot arms 2101 and the image output units 13.

SPECIFIC EXAMPLE 12

Figure 23:
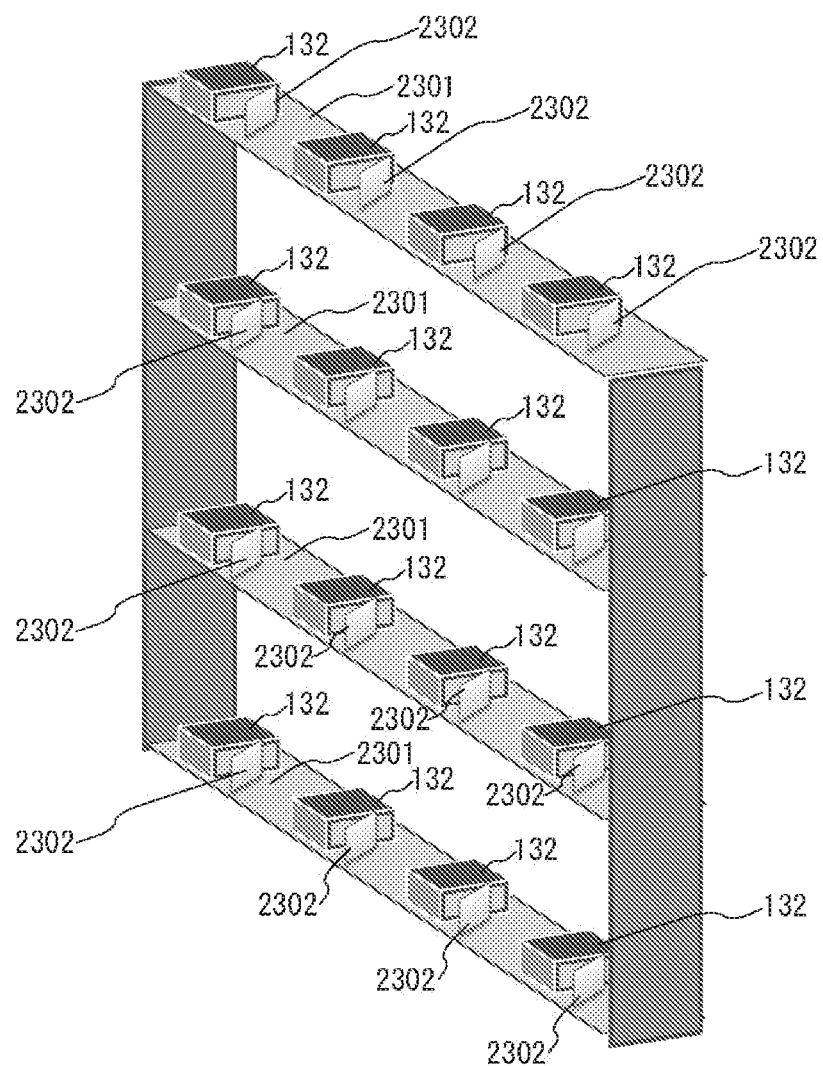
FIG. 23 is a conceptual view of the image output apparatus 1 in which optical paths can be controlled by optical devices in the embodiment.
Figure 24:
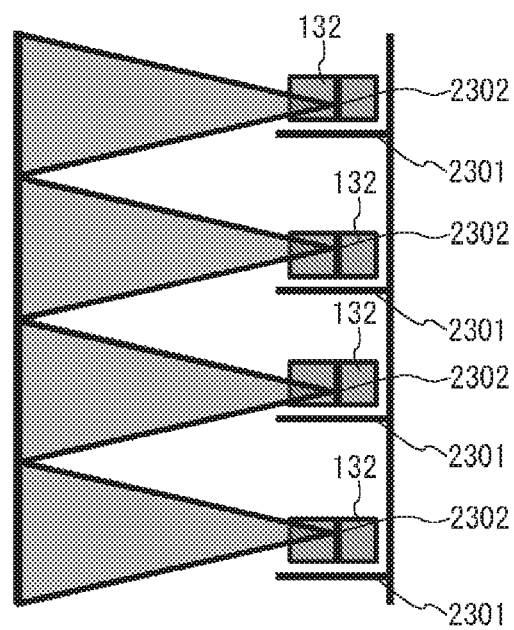
FIG. 24 is a conceptual view of projection areas of multiple projectors in the embodiment.

Specific Example 12 shows a case in which the image output units 13 respectively include the projectors 132, the projectors 132 are installed on movable shelves 2301, the optical paths can be controlled by moving optical devices 2302 provided in the image output units 13 (see FIG. 23), and the projection areas of multiple projectors do not overlap each other (see FIG. 24). The optical devices 2302 are typically mirrors.

In Specific Example 12, for example, it is assumed that the user inputs a change instruction to rotate the optical devices 2302, according to the distance between the image output apparatus 1 and the projection surface and the size of the projection surface. The accepting unit 11 accepts the change instruction. Next, the control unit 12 instructs the drive units 14 to rotate the optical devices 2302, according to the accepted change instruction. The drive units 14 rotate the optical devices 2302 according to the instruction. The optical devices 2302 rotate so as to change the optical paths of images (light) that are projected by the projectors 132. It is assumed that the change instruction to rotate the optical devices 2302 is included in the instruction to move the optical devices 2302 for changing the optical paths. The rotation of the optical devices 2302 in this case is rotation about one side of each mirror.

Hereinafter, control of each optical device 2302 described above will be described with reference to FIGS. 25 to 27.

Figure 25:
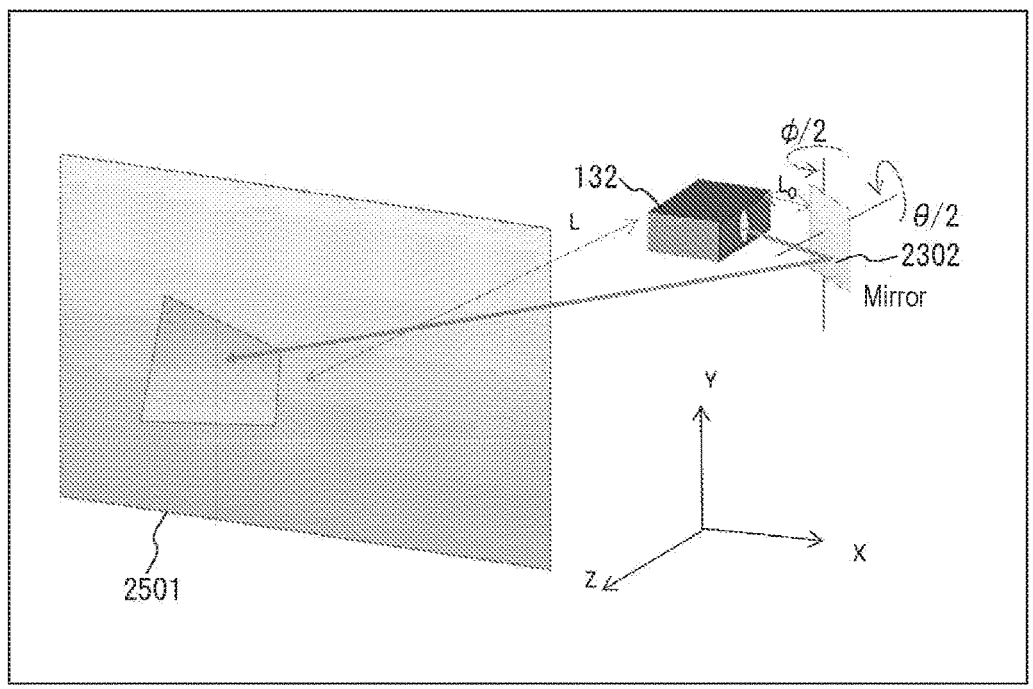
FIG. 25 is a diagram illustrating control by an optical device in the embodiment.

FIG. 25 is a diagram illustrating processing for controlling a projection position by installing the optical device 2302 in front of the projector 132 and two-dimensionally changing the angle of the optical device 2302. In FIG. 25, it is assumed that coordinate axes of the face of a screen 2501 are X-Y axes, and a coordinate axis perpendicular to the face of the screen 2501 is a Z axis. The optical axis of the projector 132 is parallel to the X axis, and the optical device 2302 rotates by (φ/2, θ/2) about the Y axis and the Z axis. Furthermore, it is assumed that a distance $L_0$ between the projector 132 and the optical device 2302 is as small as negligible compared with the projection distance L. That is to say, $L_0$ is treated as approximately 0. The rotating the optical device 2302 may be regarded as being equivalent to two-dimensionally rotating the projector 132 (see FIG. 26). The state in which the optical device 2302 has rotated by (φ/2, θ/2) about the Y axis and the Z axis in FIG. 25 can be regarded as the state which the projector 132 has rotated by θ about the X axis and by φ about the Y axis as shown in FIG. 26.

Figure 26:
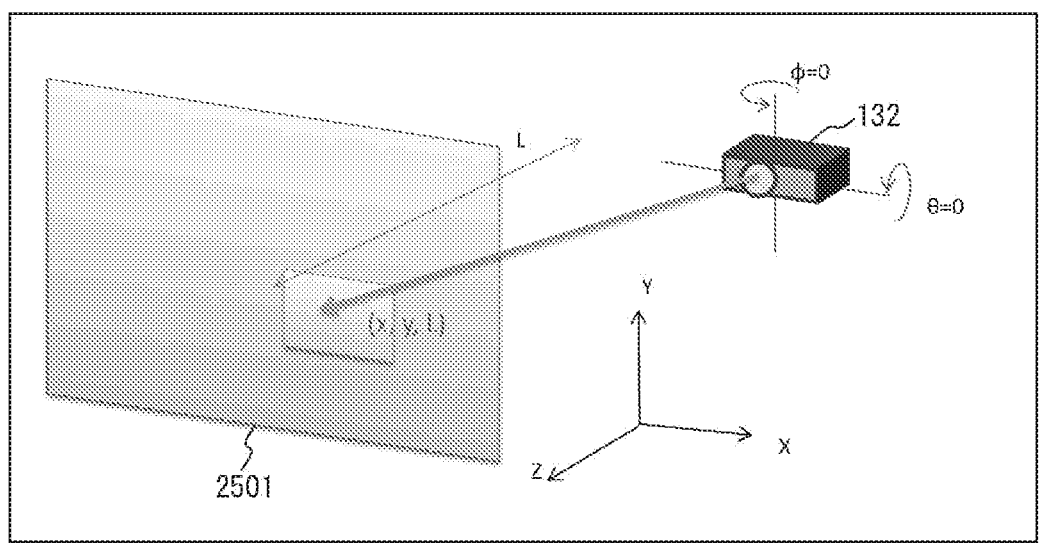
FIG. 26 is a diagram illustrating control by an optical device in the embodiment.
Figure 27:
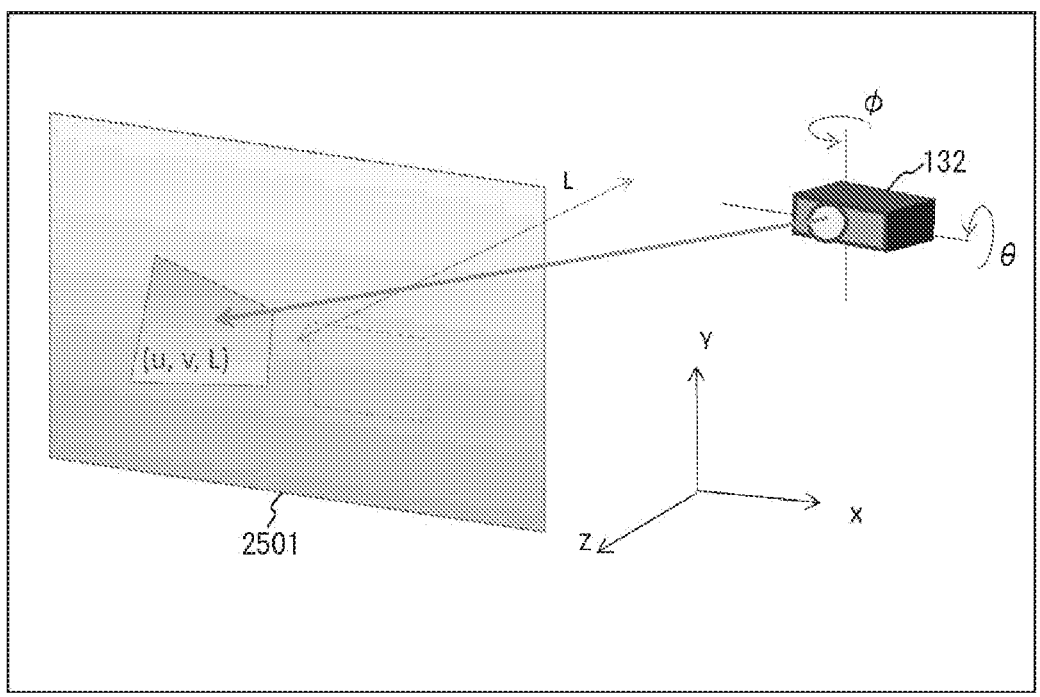
FIG. 27 is a diagram illustrating control by an optical device in the embodiment.

Furthermore, as shown in FIG. 26, it is assumed that, if θ=0 and φ=0, the projection position at which one pixel is projected from the projector 132 on the screen is (x, y, L). As shown in FIG. 27, the projection position of this one pixel moves to (u, v, L) with the rotation of the projector 132.

The relationship between the pixel position (x, y, L) and the pixel position (u, v, L) in this case is shown in Numerical Expression 1. In Numerical Expression 1, K is a coefficient for modifying the pixel position.

Numerical Expression 1

$$\begin{bmatrix} u \\ v \\ L \end{bmatrix} = K \begin{bmatrix} \cos\phi & 0 & \sin\phi \\ 0 & 1 & 0 \\ -\sin\phi & 0 & \cos\phi \end{bmatrix} \begin{bmatrix} 1 & 0 & 0 \\ 0 & \cos\theta & -\sin\theta \\ 0 & \sin\theta & \cos\theta \end{bmatrix} \begin{bmatrix} x \\ y \\ L \end{bmatrix}$$

$$= K \begin{bmatrix} x\cos\phi + y\sin\phi\sin\theta + L\sin\phi\cos\theta \\ y\cos\theta - L\sin\theta \\ -x\sin\phi + y\cos\phi\sin\theta + L\cos\phi\cos\theta \end{bmatrix}$$

$$K = \frac{L}{-x\sin\phi + y\cos\phi\sin\theta + L\cos\phi\cos\theta}$$

$$\begin{bmatrix} u \\ v \end{bmatrix} = K \begin{bmatrix} x\cos\phi + y\sin\phi\sin\theta + L\sin\phi\cos\theta \\ y\cos\theta - L\sin\theta \end{bmatrix}$$

That is to say, the control unit 12 substitutes the projection point (x, y, L) of one pixel in the case of not rotating the optical device 2302 and the target projection point (u, v, L) of that one pixel for Numerical Expression 1, thereby calculating θ and φ. Then, the control unit 12 instructs the drive unit 14 to rotate the optical device 2302, according to the calculated θ and φ. The drive unit 14 rotates the optical device 2302 according to the instruction. The optical device 2302 rotates so as to change the optical path of an image (light) that is projected by the projector 132.

Note that the expression with which the control unit 12 calculates θ and φ is not limited to Numerical Expression 1 above, and may be an expression based on a stricter model or the like.

After the optical device 2302 is moved to control the optical path, the image output apparatus 1 operates as in any one of Specific Example 1 to 3.

SPECIFIC EXAMPLE 13

Figure 28:
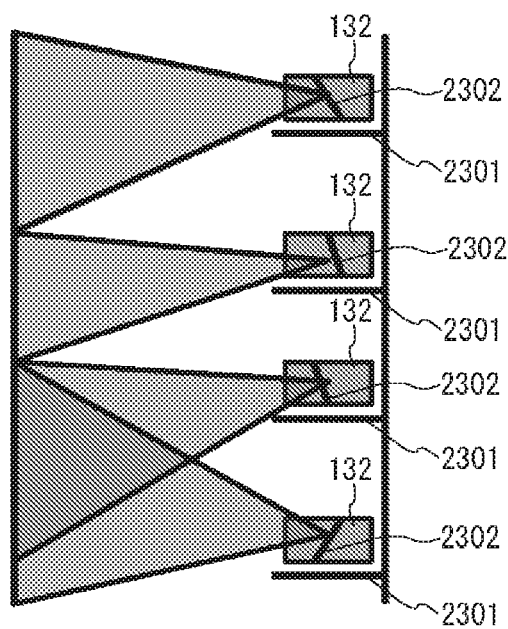
FIG. 28 is a conceptual view of projection areas of multiple projectors in the embodiment.

Specific Example 13 shows a case in which the image output units 13 respectively include the projectors 132, the projectors 132 are installed on the movable shelves 2301, the optical paths can be controlled by moving the optical devices 2302 (mirrors) provided in the image output units 13 (see FIG. 23), and there are multiple projectors whose projection areas overlap each other (see FIG. 28).

In Specific Example 13, for example, it is assumed that the user inputs a change instruction to rotate the optical devices 2302, according to the distance between the image output apparatus 1 and the projection surface and the size of the projection surface. The accepting unit 11 accepts the change instruction. Next, the drive units 14 rotate the optical devices 2302 according to the accepted change instruction, thereby changing the optical paths of images (light) that are projected by the projectors 132.

After the optical devices 2302 are moved to control the optical paths, the image output apparatus 1 operates as in any one of Specific Examples 1 to 3.

SPECIFIC EXAMPLE 14

Specific Example 14 shows a case in which the image output units 13 respectively have the projectors 132, and second images output by the multiple projectors 132 overlap each other, so that a third image having a wide-band gradation is output. The wide-band gradation refers to having more gradation levels than a narrow-band gradation.

Figure 29:
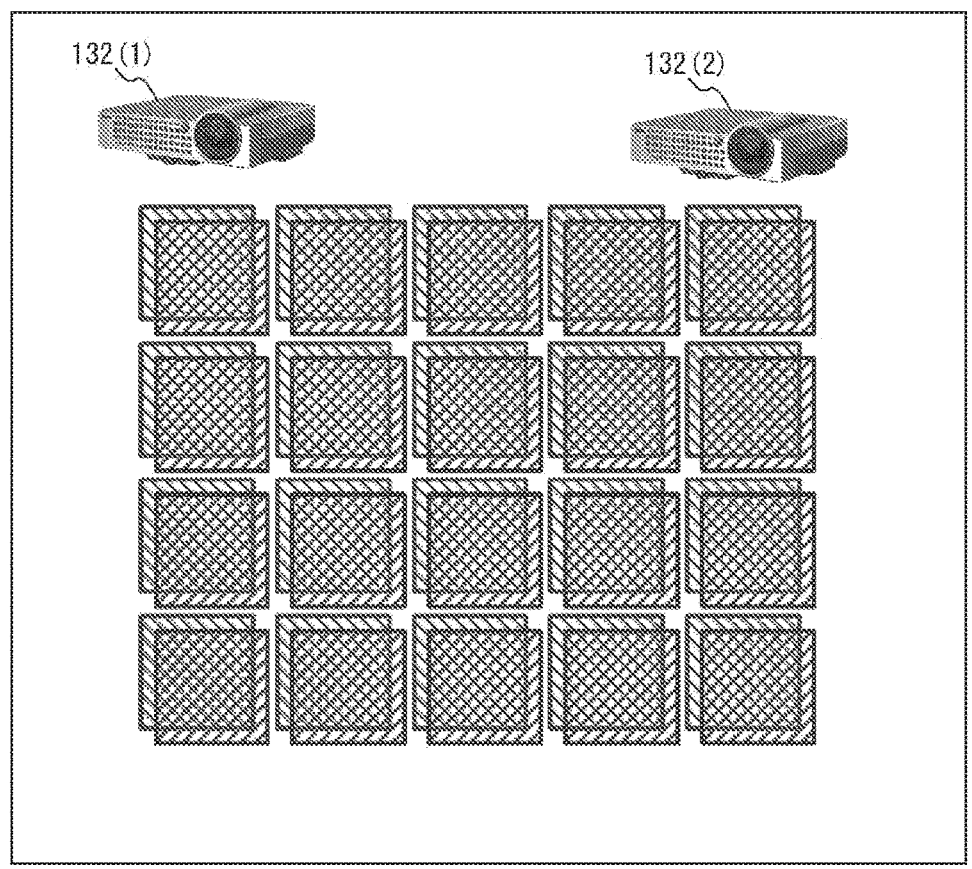
FIG. 29 is a conceptual diagram of projection areas of multiple projectors in the embodiment.

In Specific Example 14, the multiple projectors 132 output different second images to regions that at least partially overlap each other, so that the projection surface becomes brighter and the number of gradation levels becomes larger (see FIG. 29), compared with the case where outputs of the second images do not overlap each other. In FIG. 29, the number of projectors 132 is two (132(1) and 132(2)). If the multiple projectors 132 output the same second image, the number of gradation levels does not increase.

Figure 30:
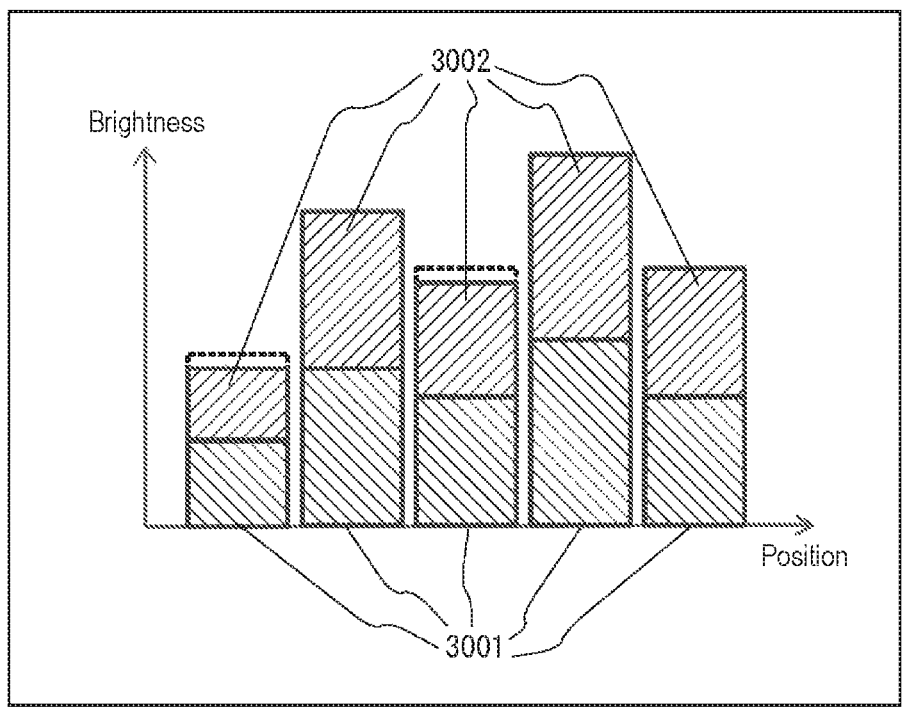
FIG. 30 is a graph illustrating a theory for realizing increasing the number of gradation levels in the embodiment.

The theory in this case will be described with reference to the graph in FIG. 30. It is assumed that each of the projectors 132 in FIG. 29 outputs a second image having 8-bit gradation (each pixel has a pixel value of 0 to 255). In the graph in FIG. 30, the vertical axis indicates the brightness, and the horizontal axis indicates the projection position of each projector 132. Furthermore, 3001 denotes the amount of increase in the brightness at each position (region) due to a second image output by the projector 132(1), and 3002 denotes the amount of increase in the brightness at each position (region) due to a second image output by the projector 132(2). Each pixel in a third image obtained as a result of output of two second images may have a pixel value of 0 to 510, and the gradation has 511 levels. That is to say, each pixel in a second image(1) output by the projector 132(1) may have a pixel value of 0 to 255, and, each pixel in a second image(2) output by the projector 132(2) may have a pixel value of 0 to 255, and thus each pixel in a region where the two second images overlap each other may have a pixel value of 0 to 510. As shown in FIG. 30, if the pixel value of a second image that is output by one of the two projectors 132 is increased or decreased by one, the number of gradation levels of a third image can be increased.

Note that, in Specific Example 14, the control unit 12 reads specifying information corresponding to each of the projectors 132, from an unshown buffer, and determines information that is to be given to each of the projectors 132 such that the second images that are to be output by the projectors 132 overlap each other as shown in FIG. 29. The specifying information is information associated with each of the projectors 132, and is, for example, information indicating a region to which each of the projectors 132 outputs a second image.

Next, each of the image processing parts 131 performs predetermined image processing on the information (typically, an image) determined by the control unit 12, thereby generating a second image that is to be output by each of the projectors 132. The projectors 132 respectively output the second images generated by the image processing parts 131. As a result, a third image having an increased number of gradation levels compared with that of each of the first image and/or second images is displayed on a screen, a wall, or the like.

SPECIFIC EXAMPLE 15

Figure 31:
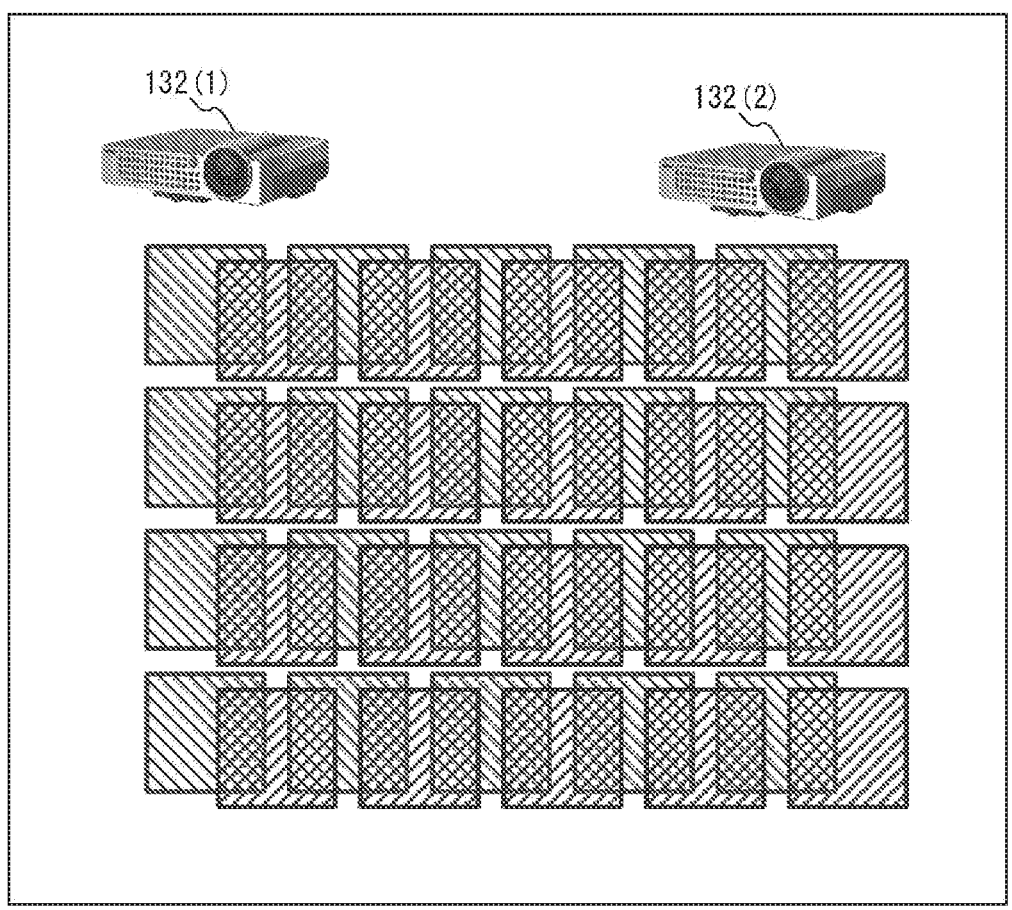
FIG. 31 is a conceptual diagram of projection areas of multiple projectors in the embodiment.

Specific Example 15 shows a case in which the image output units 13 respectively have the projectors 132, and the multiple projectors 132 output the second images while shifting the second images by a predetermined level of precision, so that a third image having a wide-band spatial resolution is output (see FIG. 31). In FIG. 31, the number of projectors 132 is two (132(1) and 132(2)).

Figure 32:
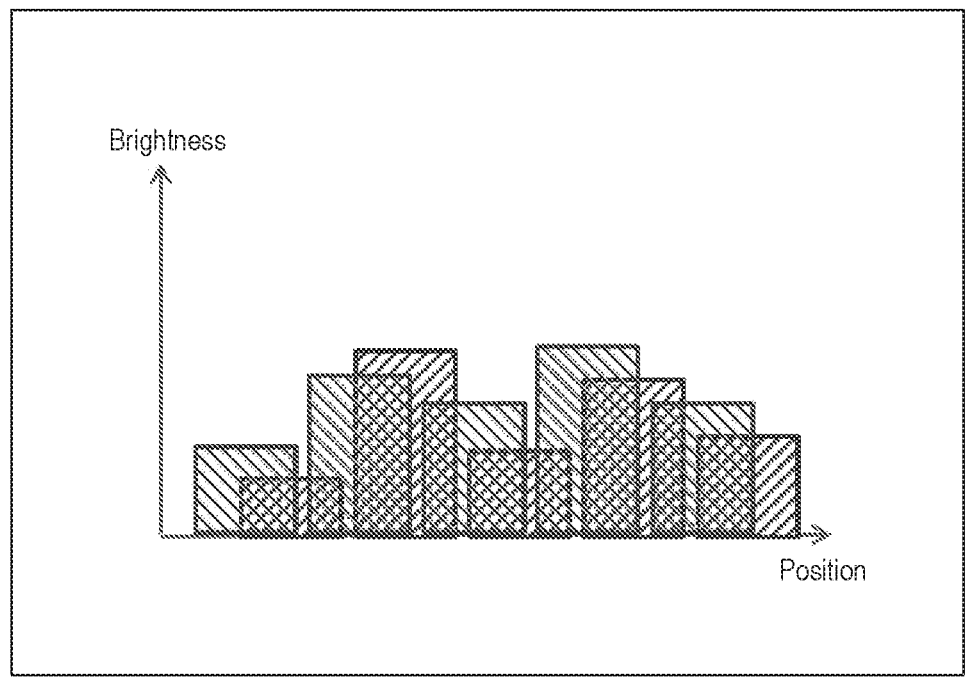
FIG. 32 is a graph illustrating a theory for realizing a wide-band spatial resolution in the embodiment.
Figure 33:
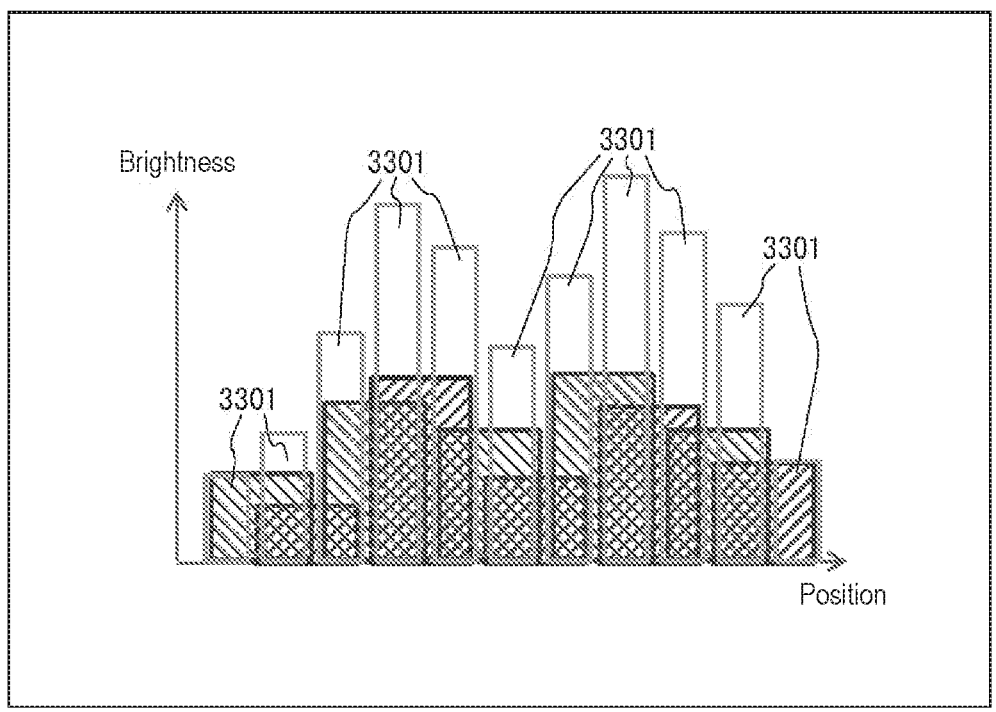
FIG. 33 is a graph illustrating a theory for realizing a wide-band spatial resolution in the embodiment.

The theory in this case will be described with reference to the graphs in FIGS. 32 and 33. For example, the projectors 132 in FIG. 31 output the second images while shifting the output positions by an amount smaller than one pixel (e.g., 0.6 pixels). Then, as shown in FIG. 32, a pixel of a second image output by the projector 132(2) is interposed between pixels of a second image output by the projector 132(1), so that a third image having an increased spatial resolution compared with that of each second image is displayed. A third image having an increased spatial resolution is shown, for example, as 3301 in the graph in FIG. 33. In the third image, typically, the brightness of each pixel has increased.

The amount by which the pixel positions of the second images output respectively by multiple projectors 132 are shifted may be more than one pixel. In this case, after shift amounts in units of pixels are modified in advance in the second images, processing for shift amounts smaller than one pixel is performed in a similar manner.

SPECIFIC EXAMPLE 16

Figure 34:
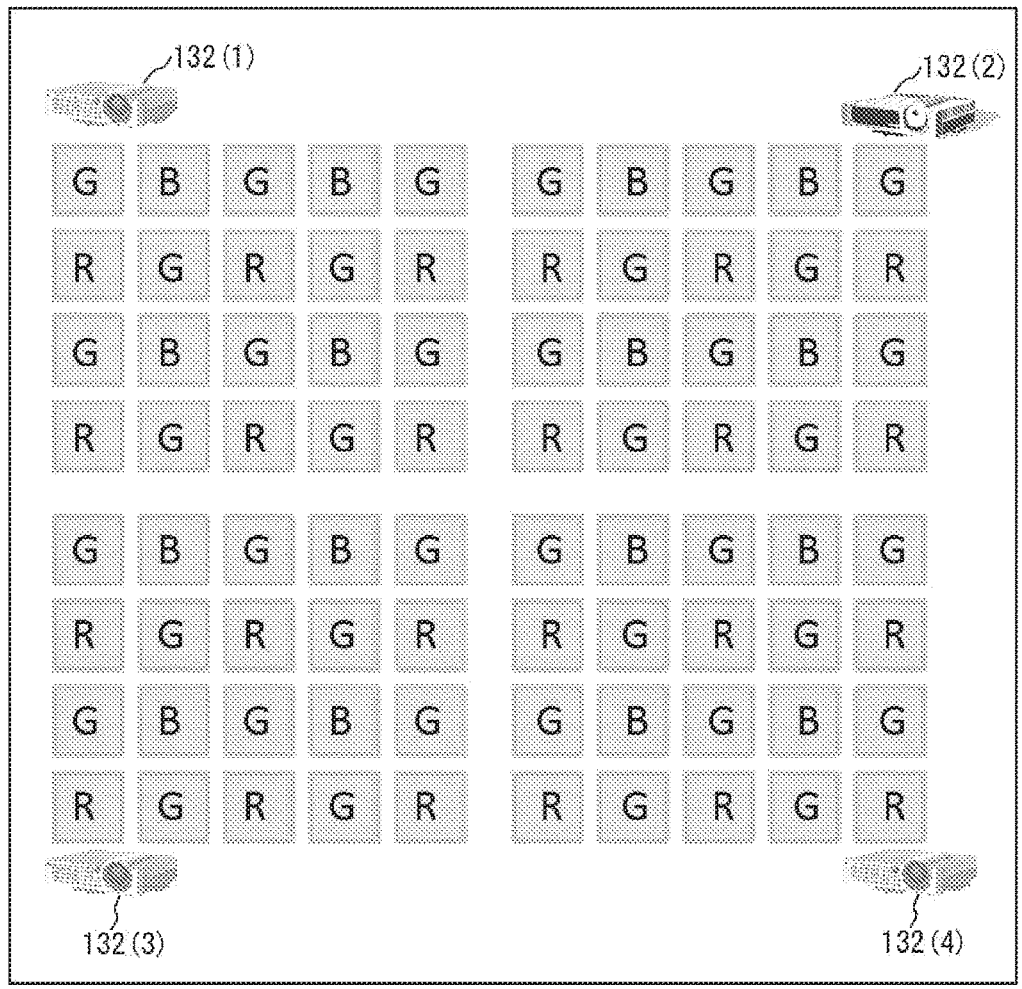
FIG. 34 is a diagram illustrating a theory for realizing a wide-band spatial resolution in the embodiment.
Figure 35:
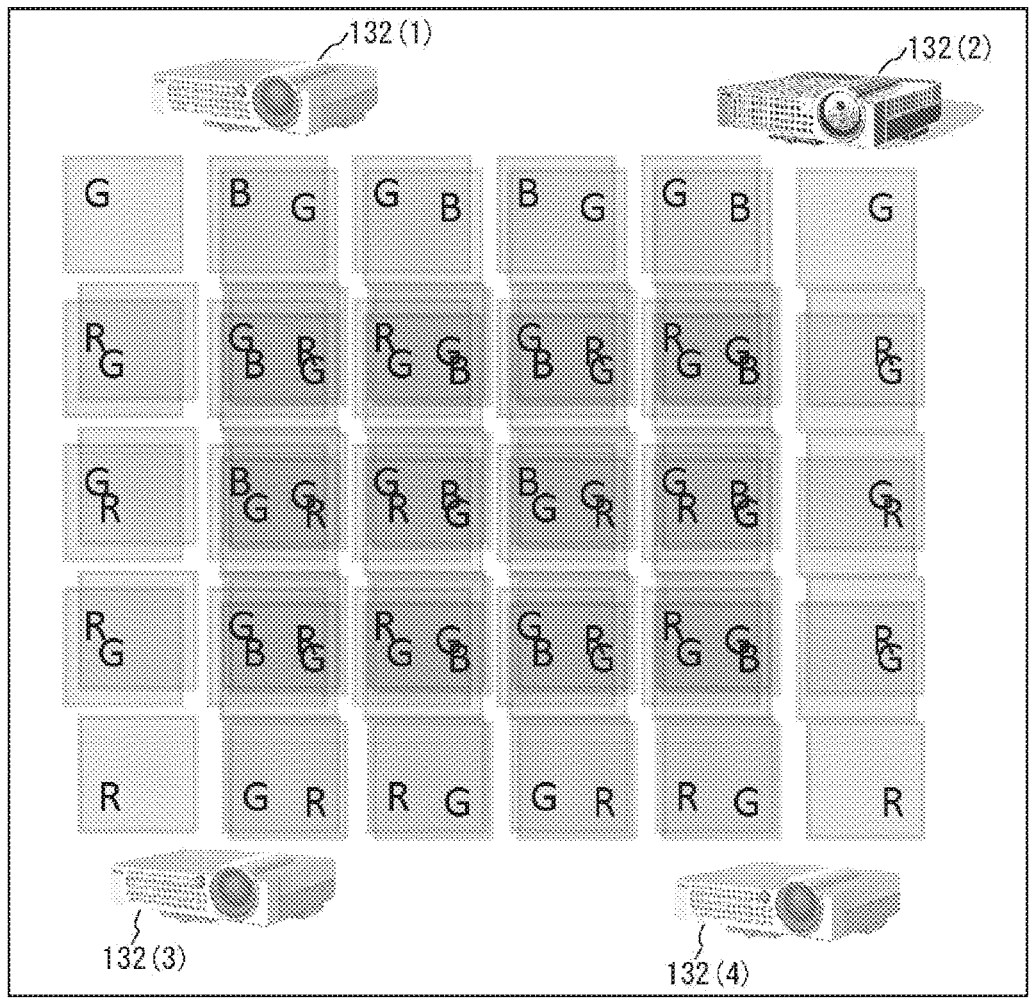
FIG. 35 is a diagram illustrating a theory for realizing a wide-band spatial resolution in the embodiment.

Specific Example 16 shows a case in which the image output units 13 have the multiple projectors 132, and the pixel structure of the projectors 132 is the Bayer arrangement. It is assumed that, as the first image, an image of a band corresponding to the Bayer arrangement of the projectors is input. The multiple projectors 132 output the second images, for example, while shifting the second images by one pixel, so that a third image having a wide-band spatial resolution is output. As shown in FIG. 34, in the projectors, green pixels (G), red pixels (R), and blue pixels (B) are arranged in a checkered pattern. In FIG. 34, it is assumed that a projector 132(1), a projector 132(2), a projector 132(3), and a projector 132(4) arranged at different positions output the second images, for example, by one pixel. In this case, as shown in FIG. 35, for example, at a certain location, the projector 132(1) and the projector 132(4) are allocated to green pixels (G), the projector 132(2) is allocated to red pixels (R), and the projector 132(3) is allocated to blue pixels (B). As a result, a third image having an increased spatial resolution compared with that of each of the first image and/or second images is displayed.

SPECIFIC EXAMPLE 17

Specific Example 17 shows a case in which the image output units 13 respectively have the projectors 132, and the multiple projectors 132 output the second images in a time-division manner, so that a third image having a wide-band temporal resolution is output.

Typically, for example, each of the multiple projectors 132 outputs the second image at a temporal resolution of 60 Hz.

For example, if the image output apparatus 1 has two projectors 132 (132(1) and 132(2)), the control unit 12 controls the two projectors 132 so as to output the second images sequentially and repeatedly in a time-division manner.

This control will be described with reference to FIGS. 36 and 37. At the start of display (%120 (s)), the control unit 12 reads information (e.g., "ON" or "1") for specifying the projector 132(1) and information (e.g., "OFF" or "0") for specifying the projector 132(2) from an unshown buffer. Then, the control unit 12 acquires an image at %120 (s) in the first-image information accepted by the accepting unit 11, according to the information (e.g., "ON") for specifying the projector 132(1), and gives it to the image processing part 131 corresponding to the projector 132(1).

Next, the image processing part 131 performs predetermined processing on the given image, thereby generating a second image. Next, the projector 132(1) outputs the second image (see FIG. 36). The control unit 12 does not give the information to the image processing part 131 corresponding to the projector 132(2), according to the information (e.g., "OFF") of the projector 132(2). Note that the control unit 12 may block the output from the projector 132(2) (see FIG. 36).

Next, the control unit 12 acquires an image at ¹⁄₁₂₀ (s) in the first-image information accepted by the accepting unit 11, in the period from the start of display to "¹⁄₁₂₀ (s)", and gives it to the image processing part 131 corresponding to the projector 132(2). Next, the image processing part 131 performs predetermined processing on the given image, thereby generating a second image. Next, the projector 132(2) outputs the second image (see FIG. 37). The control unit 12 does not give the information to the image processing part 131 corresponding to the projector 132(1). Note that the control unit 12 may block the output from the projector 132(1) (see FIG. 37).

Figure 36:
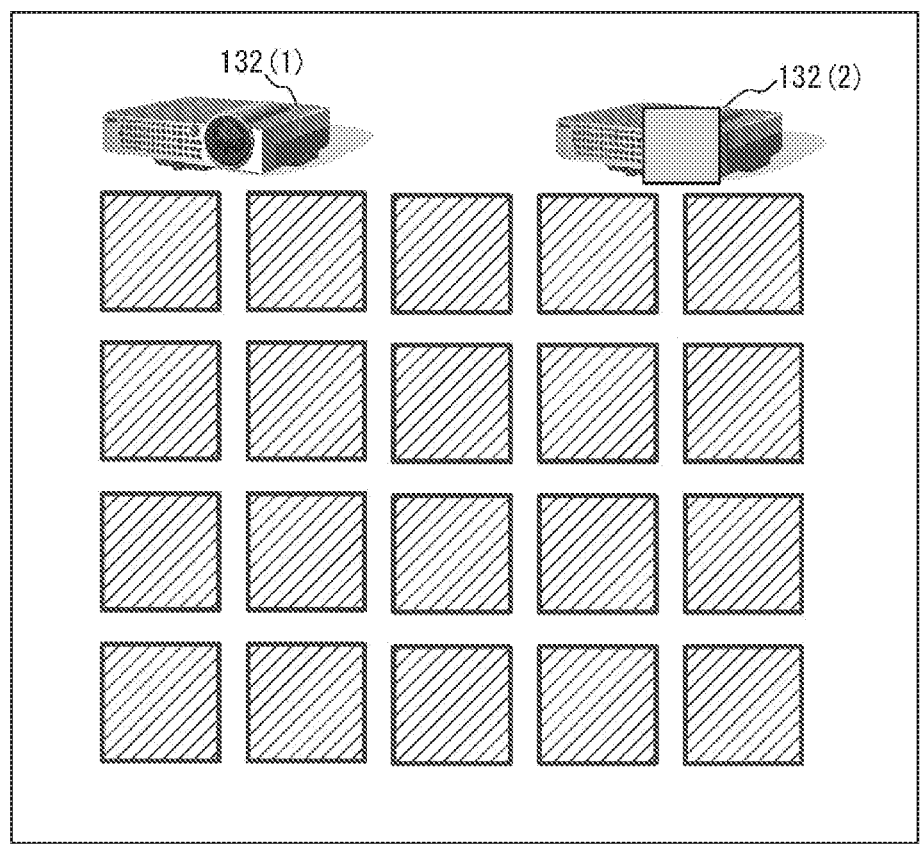
FIG. 36 is a diagram illustrating a theory for realizing a wide-band temporal resolution in the embodiment.
Figure 37:
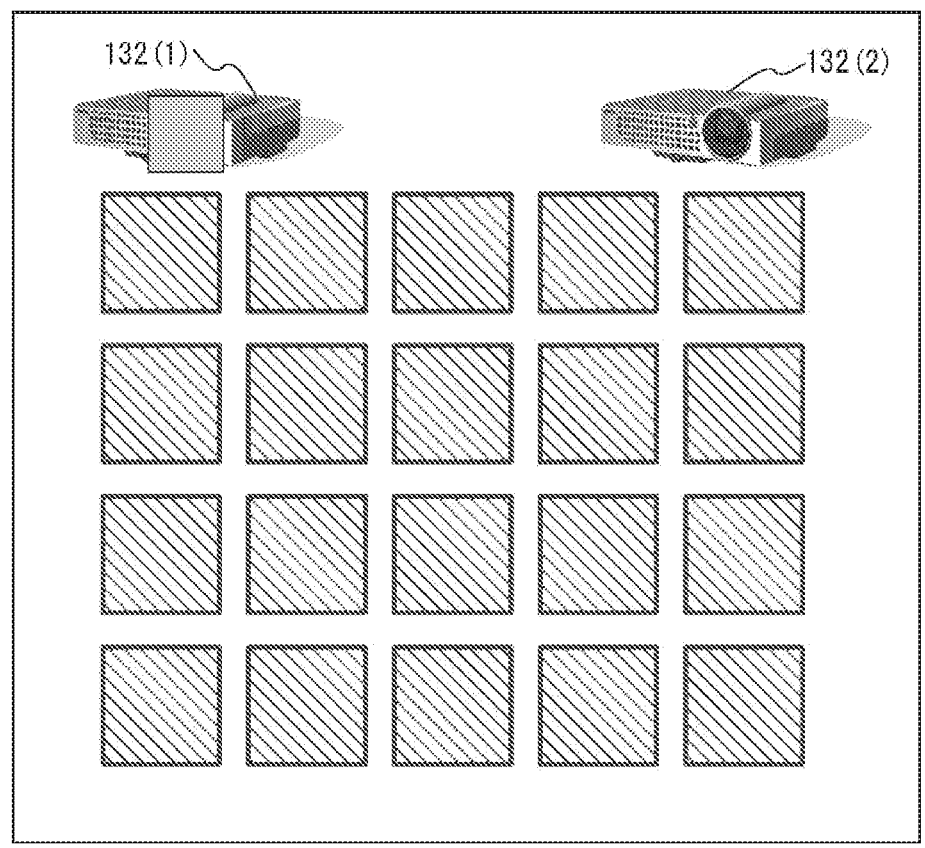
FIG. 37 is a diagram illustrating a theory for realizing a wide-band temporal resolution in the embodiment.
Figure 38:
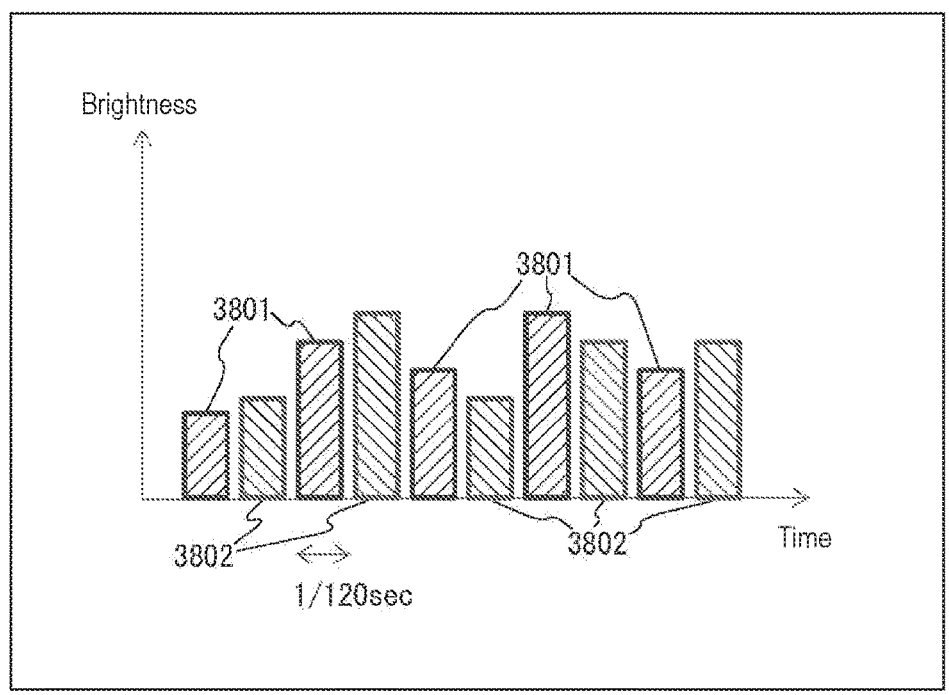
FIG. 38 is a graph illustrating a theory for realizing a wide-band temporal resolution in the embodiment.

While the accepting unit 11 is accepting an image, the control unit 12 and the image output units 13 alternately and repeatedly perform the processing described in FIGS. 36 and 37. As a result, while the temporal resolution of the second image output from each of the projectors 132 is being "60 Hz", the temporal resolution of the third image becomes "120 Hz" (see FIG. 38). In FIG. 38, 3801 denotes output by the projector 132(1), and 3802 denotes output by the projector 132(2).

That is to say, in Specific Example 17, a third image having an increased temporal resolution compared with that of each of the first image and/or second images is displayed.

SPECIFIC EXAMPLE 18

Figure 39:
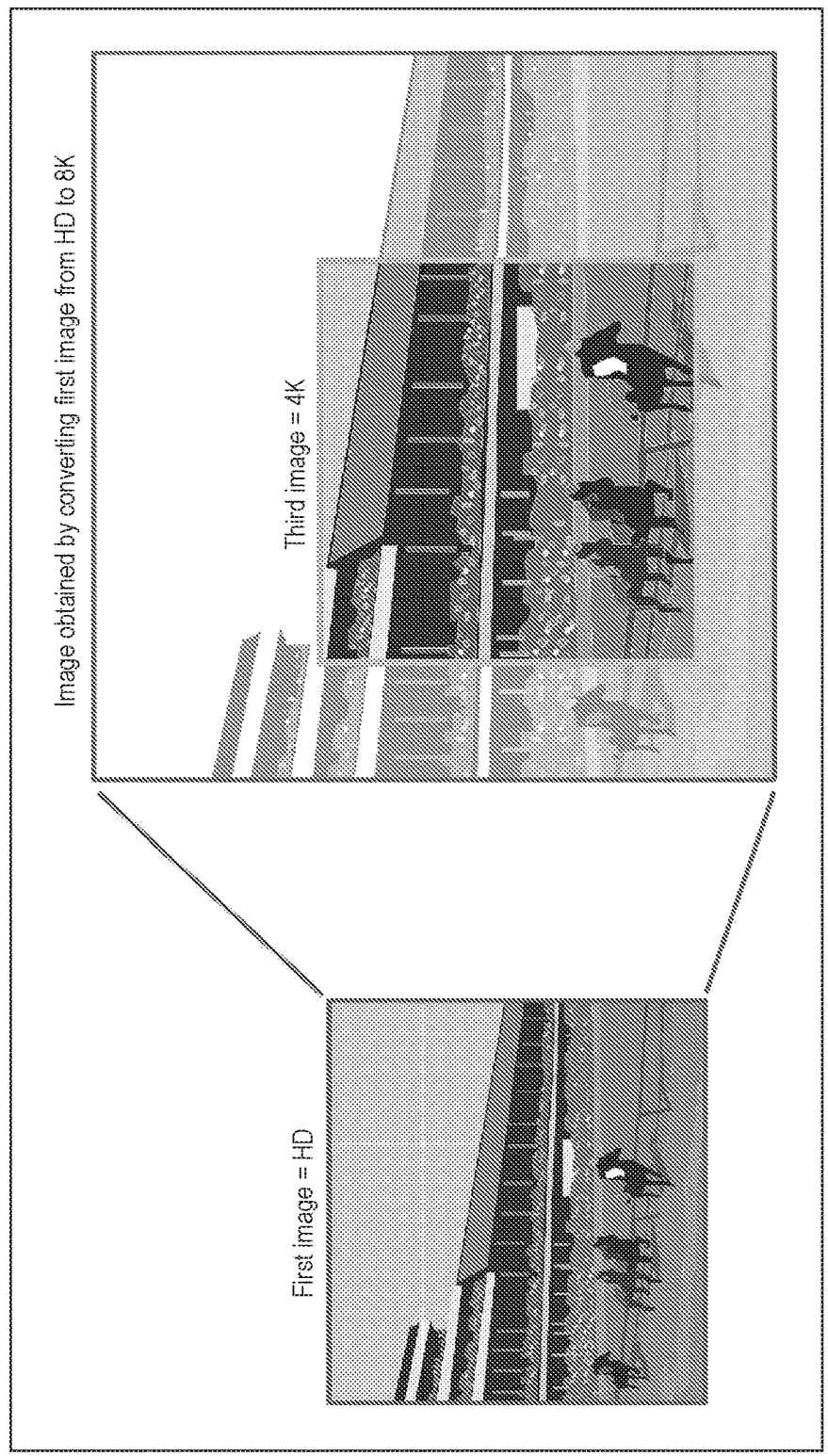
FIG. 39 is a conceptual view of processing for outputting a third image subjected to value creation in the embodiment.

Specific Examples 18 and 19 show a case in which the processing shown in FIG. 39 is realized. In FIG. 39, it is assumed that the first image is, for example, an HD image. Furthermore, the third image displayed by output of the second images by the multiple image output units 13 is an image obtained by increasing the resolution of part of the first image. For example, if the resolution of the first image is multiplied by four times in each of the horizontal and vertical directions and a region having a half length in each of the horizontal and vertical directions is displayed as a third image, the third image is an image obtained by increasing the resolution of the first image to 8K, and part of this third image is displayed as a zoomed 4K image.

Figure 40:
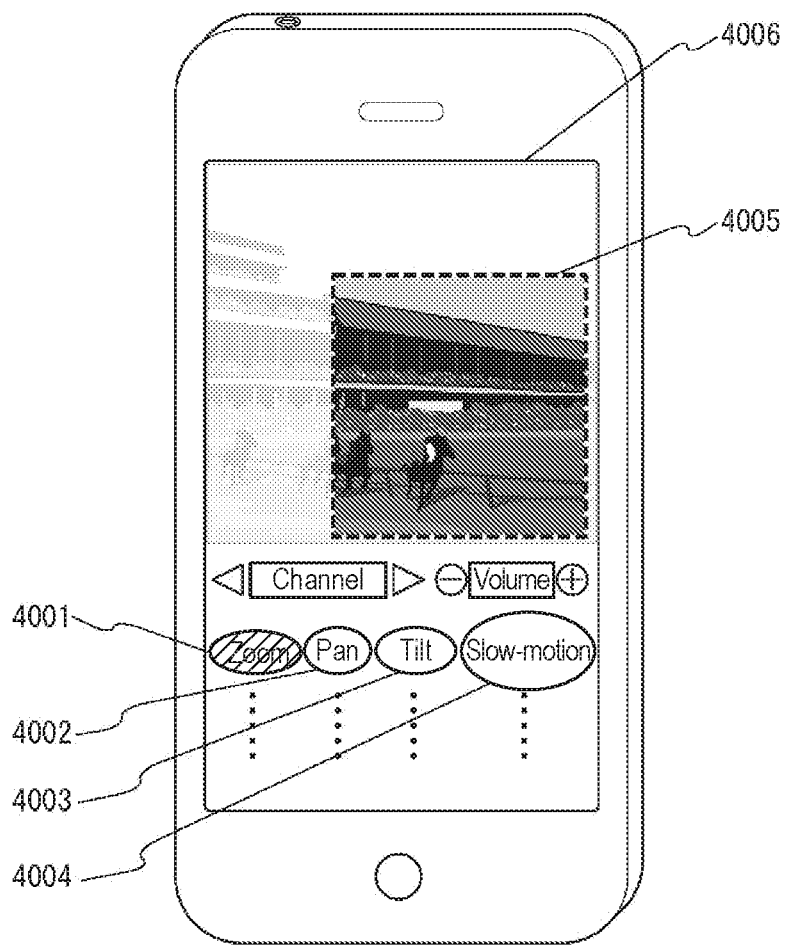
FIG. 40 is a view showing an example of a remote controller in the embodiment.

It is assumed that the user manipulates an image that is to be output by the image output apparatus 1, using a remote controller in FIG. 40. The remote controller in FIG. 40 is, for example, a so-called smartphone. The remote controller may also be a mobile terminal, a mobile phone, a dedicated remote controller, or the like. In the remote controller in FIG. 40, 4001 denotes a zoom button, 4002 denotes a pan button, 4003 denotes a tilt button, and 4004 denotes a slow-motion button.

It is assumed that the user presses the zoom button 4001 and sets the size and the position of a zoom window 4005 as shown in FIG. 40. Note that the screen portion of the remote controller displays an image that is to be output by the image output apparatus 1, as shown in 4006.

Next, the accepting unit 11 accepts an instruction for output control. This instruction for output control is a zooming instruction, and has information on the region of the zoom window 4005.

Next, the control unit 12 acquires information on each of the positions of four projectors (132(1), 132(2), 132(3), 132(4)), from an unshown buffer.

Next, the control unit 12 acquires information on a second image that is to be output by each projector 132, using the instruction for output control and the acquired information on the projector 132.

Figure 41:
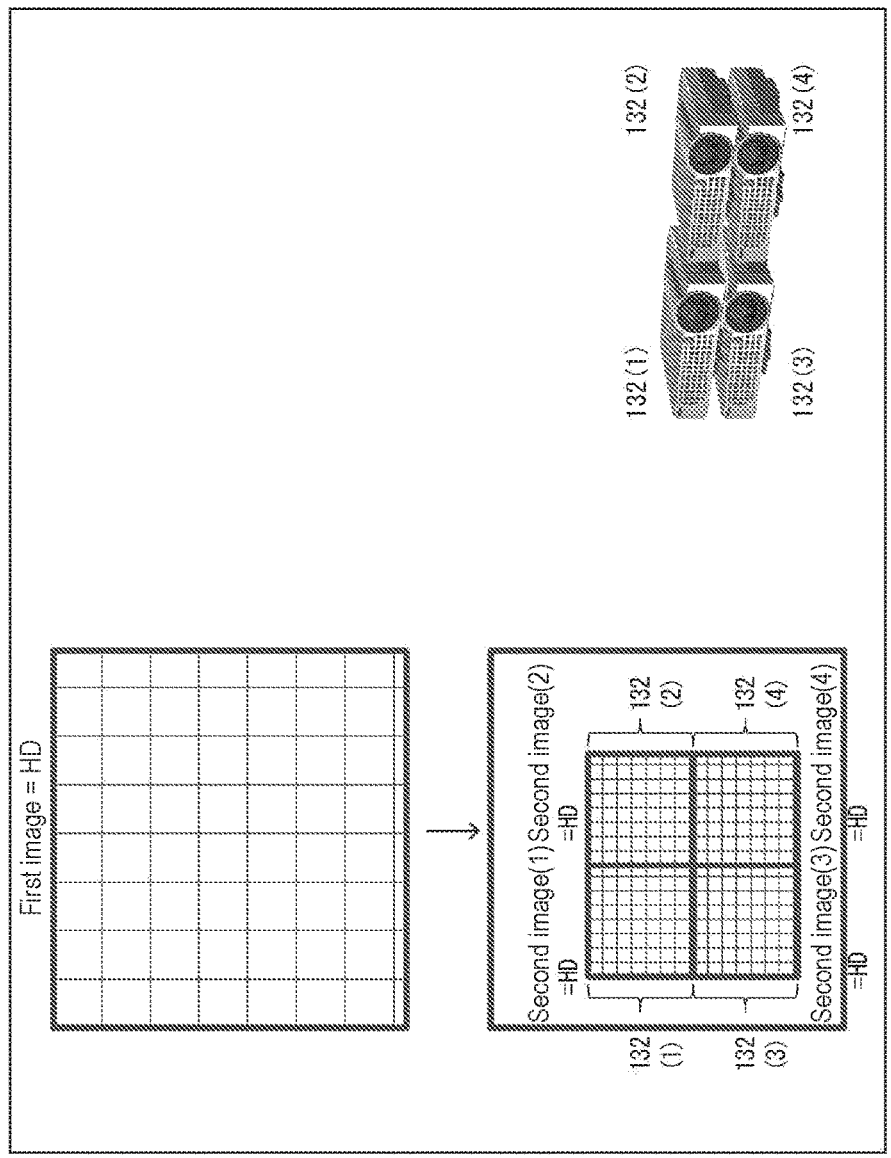
FIG. 41 is a diagram illustrating zooming processing in the embodiment.

Next, the control unit 12 instructs the image processing part 131 corresponding to the projector 132(1) to acquire an image of a region defined as 132(1) in FIG. 41, using the acquired information on the second image. The control unit 12 instructs the image processing part 131 corresponding to the projector 132(2) to acquire an image of a region defined as 132(2) in FIG. 41, using the acquired information. The control unit 12 instructs the image processing part 131 corresponding to the projector 132(3) to acquire an image of a region defined as 132(3) in FIG. 41, using the acquired information. Furthermore, the control unit 12 instructs the image processing part 131 corresponding to the projector 132(4) to acquire an image of a region defined as 132(4) in FIG. 41, using the acquired information.

Next, the image processing parts 131 respectively corresponding to the projector 132 perform predetermined image processing, thereby generating second images that are to be output.

Figure 42:
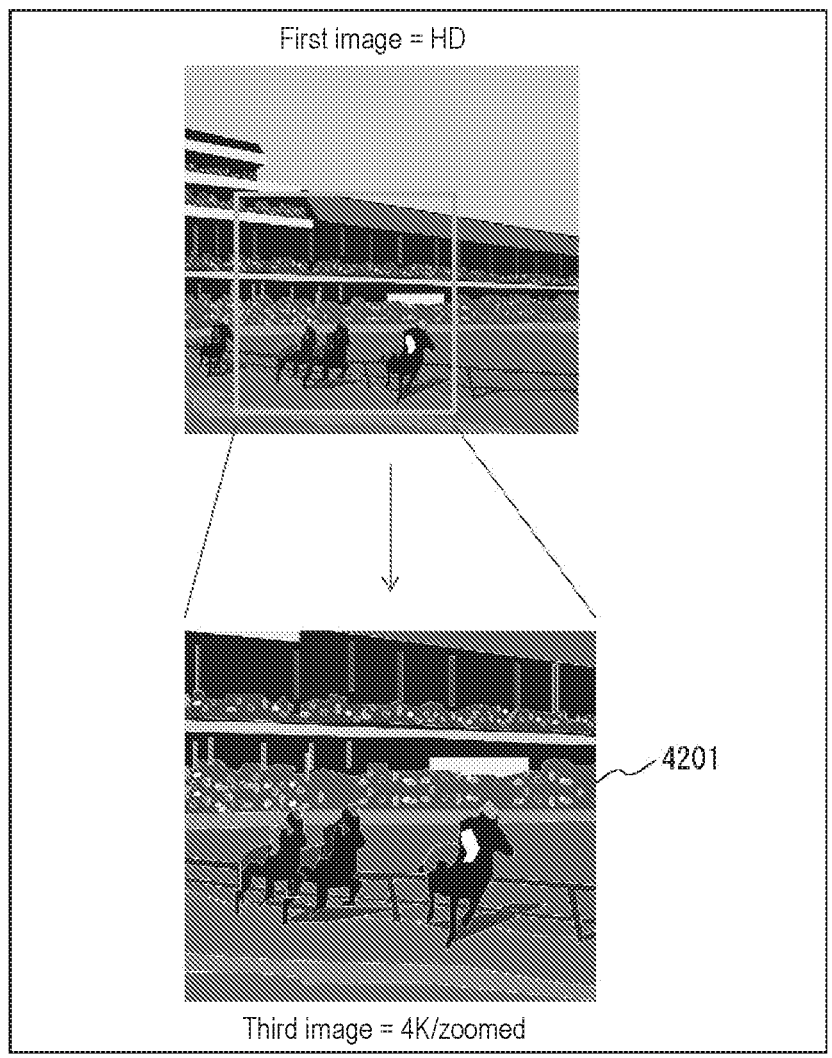
FIG. 42 is a view illustrating zooming processing in the embodiment.

Next, the projectors 132 respectively output the second images generated by the image processing parts 131. As shown in FIG. 42, a zoomed 4K third image 4201 is output.

SPECIFIC EXAMPLE 19

In Specific Example 19, it is assumed that the user inputs an instruction to pan or tilt an image that is to be output by the image output apparatus 1, using the remote controller in FIG. 40 (by pressing the button 4003 or 4004). Next, the accepting unit 11 accepts the panning or tilting instruction. This instruction for output control has information on the region of the zoom window 4005 and the movement of that region.

Next, the control unit 12 acquires information on each of the positions of four projectors (132(1), 132(2), 132(3), 132(4)), from an unshown buffer.

Then, the following processes (A) to (D) are repeatedly performed until the panning or tilting is ended.

(A) The control unit 12 acquires information on a second image that is to be output by each projector 132, using the instruction for output control and the acquired information on the projector 132.

(B) The control unit 12 instructs the projector 132(1) to acquire an image of a region indicated as 132(1) in FIG. 41, using the acquired information on the second image. The control unit 12 instructs the projector 132(2) to acquire an image of a region indicated as 132(2) in FIG. 41, using the acquired information. The control unit 12 instructs the projector 132(3) to acquire an image of a region indicated as 132(3) in FIG. 41, using the acquired information. Furthermore, the control unit 12 instructs the projector 132(4) to acquire an image of a region indicated as 132(4) in FIG. 41, using the acquired information.

(C) The image processing parts 131 respectively corresponding to the projector 132 perform predetermined image processing, thereby generating second images that are to be output.

(D) The projectors 132 respectively output the second images generated by the image processing parts 131. Then, the position that is to be zoomed is changed, and the procedure returns to (A). That is to say, if the position that is to be zoomed is changed, the panning or tilting is realized.

Figure 43:
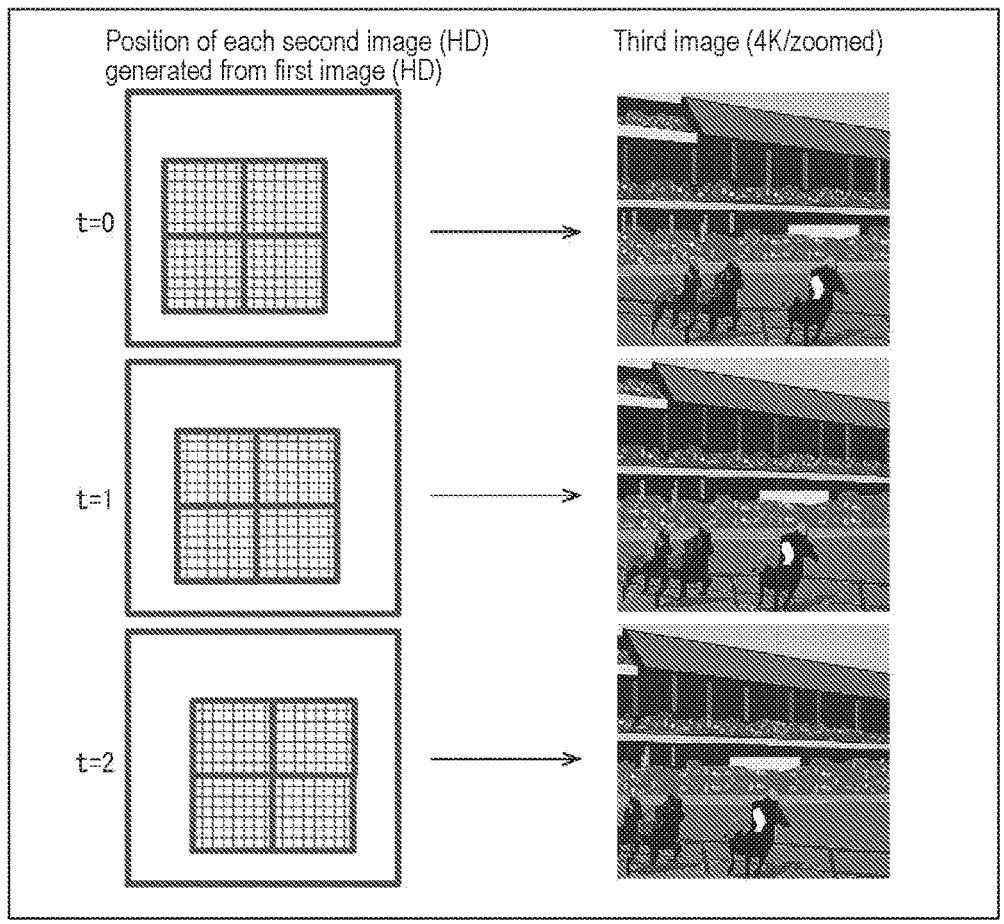
FIG. 43 is a diagram illustrating panning or tilting processing in the embodiment.

As shown in FIG. 43, zoomed 4K third images 4201 are sequentially output, and the panning or tilting is realized.

SPECIFIC EXAMPLE 20

In Specific Example 20, it is assumed that the user inputs two instructions for slow motion and zooming of an image that is to be output by the image output apparatus 1, using the remote controller in FIG. 40 (by pressing the buttons 4001 and 4004). It is assumed that these instructions are an instruction to output an image in slow motion at ¼ times speed and an instruction to zoom the image.

Next, the accepting unit 11 accepts the instruction for output control.

Next, the control unit 12 acquires information on each of the positions of four projectors (132(1), 132(2), 132(3), 132(4)), from an unshown buffer.

Next, the control unit 12 determines information that is to be given to each image output unit 13, using the instruction for output control and the acquired information on the corresponding projector 132. Next, the control unit 12 acquires the determined information, using the first-image information. That is to say, the control unit 12 acquires information that is to be given to each of the image processing parts 131 respectively corresponding to the projectors 132.

Next, each of the four image processing parts 131 performs predetermined image processing on the information acquired by the control unit 12, thereby generating a second image that is to be output.

Figure 44:
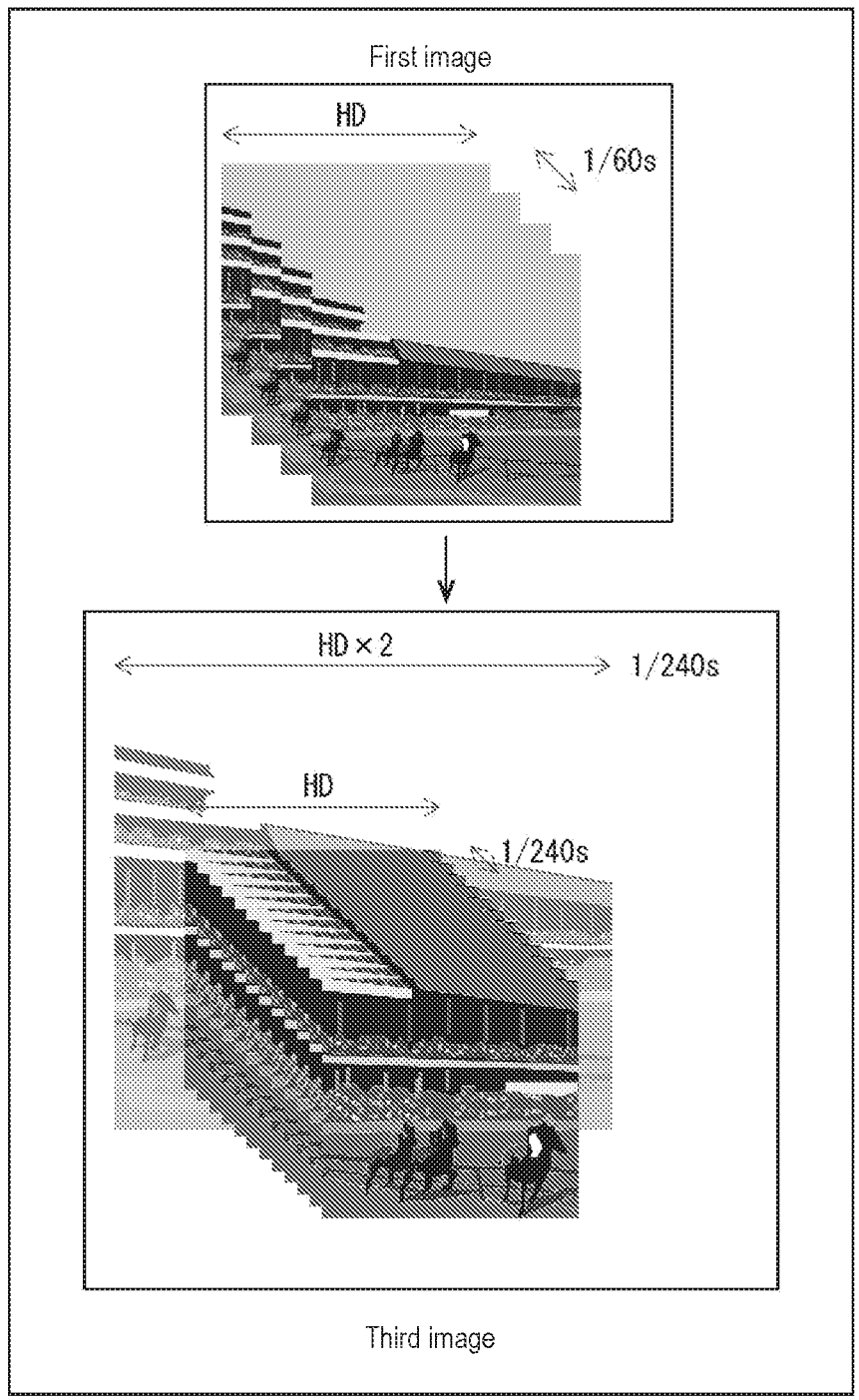
FIG. 44 is a view illustrating slow-motion and zooming processing in the embodiment.

Next, the projectors (132(1), 132(2), 132(3), and 132(4)) optically output the second images generated by the corresponding image processing parts 131. In this specific example, as described in Specific Example 17, if the four the projectors 132 output the second images in a time-division manner, a third image having a temporal resolution that is four times as high as that of the first image can be output. Furthermore, if the image acquired by the control unit 12 is an image of a region indicated by the zooming instruction, the zooming is realized. FIG. 44 shows a conceptual view in this case. In FIG. 44, a case is shown in which the first image is an HD image at 60 Hz, and the third image is an HD image at 240 Hz.

Note that, in this specific example, if the third image is reproduced at 60 Hz, slow motion is realized.

SPECIFIC EXAMPLE 21

In Specific Example 21, it is assumed that the user inputs a gradation-extending output instruction, which is a type of instruction for output control, to the image output apparatus 1. The gradation-extending output instruction is an instruction to extend the gradation of part of a third image. The gradation-extending output instruction may be referred to as an instruction to extend the gradation of part of an image that is to be output by the image output apparatus 1 and perform output. The extending the gradation and performing output refers to an operation that, for example, converts the input signal levels in the range of 0 to 127 into 0 to 255 and performs output, or converts the input signal levels in the range of 128 to 255 into 0 to 255 and performs output, if the accepting unit 11 accepts an input image that is 8-bit first-image information, as in FIG. 45. In this case, it is preferable that gradation creation is performed by signal processing.

It is assumed that, when the accepting unit 11 is accepting an input image that is 8-bit first-image information, the accepting unit 11 accepts, for example, a gradation-extending output instruction from the user.

Next, the control unit 12 acquires information on each of the positions of four projectors (132(1), 132(2), 132(3), 132(4)), from an unshown buffer.

Next, the control unit 12 determines information that is to be given to each image output unit 13, using the gradation-extending output instruction and the acquired information on the corresponding projector 132. Next, the control unit 12 acquires the determined information, using the first-image information. That is to say, the control unit 12 acquires information that is to be given to each of the image processing parts 131 respectively corresponding to the projectors 132.

Next, the four image processing parts 131 perform the above-described processing for extending the gradation of part of the input image, on the information acquired by the control unit 12, thereby generating a second image that is to be output.

Next, the projectors (132(1), 132(2), 132(3), and 132(4)) optically output the second images generated by the corresponding image processing parts 131.

Figure 45:
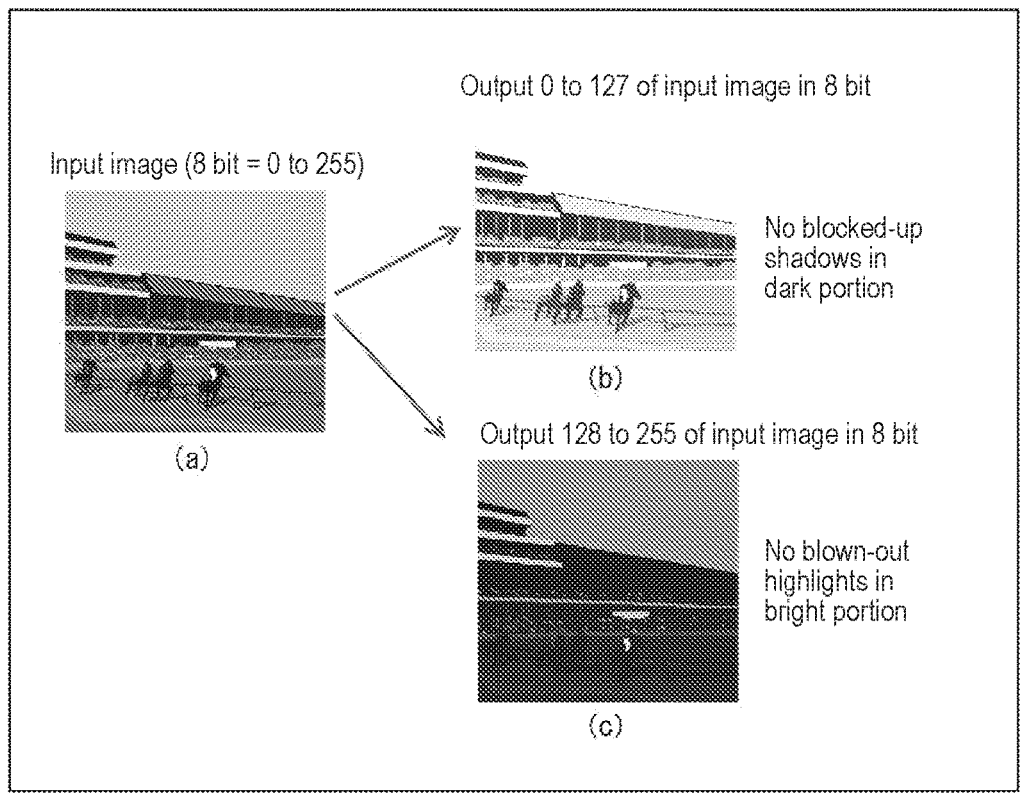
FIG. 45 is a view illustrating processing for extending the gradation of part of an input image and performing output in the embodiment.

As shown in FIG. 45, a third image part of which has an extend gradation is output. If an 8-bit input image (a) in FIG. 45 is output such that the input signal levels in the range of 0 to 127 are converted into 0 to 255 (in the case of (b) of FIG. 45), a third image is displayed without blocked-up shadows in dark portions of the input image. If an 8-bit input image (a) in FIG. 45 is output such that the input signal levels in the range of 128 to 255 are converted into 0 to 255 (in the case of (c) of FIG. 45), a third image is displayed without blown-out highlights in bright portions of the input image.

As described above, according to this embodiment, an image output apparatus 1 in which a wide-band image can be output in a narrow band is provided. Note that the having a wide band is, for example, having a larger spatial resolution, a larger temporal resolution, a larger number of gradation levels, or the like, compared with the case of having a narrow band.

Note that, in the specific examples of this embodiment, the number of image processing parts 131 such as projectors is typically a power of two, but it will be appreciated that the number is not limited to a power of two.

Figure 46:
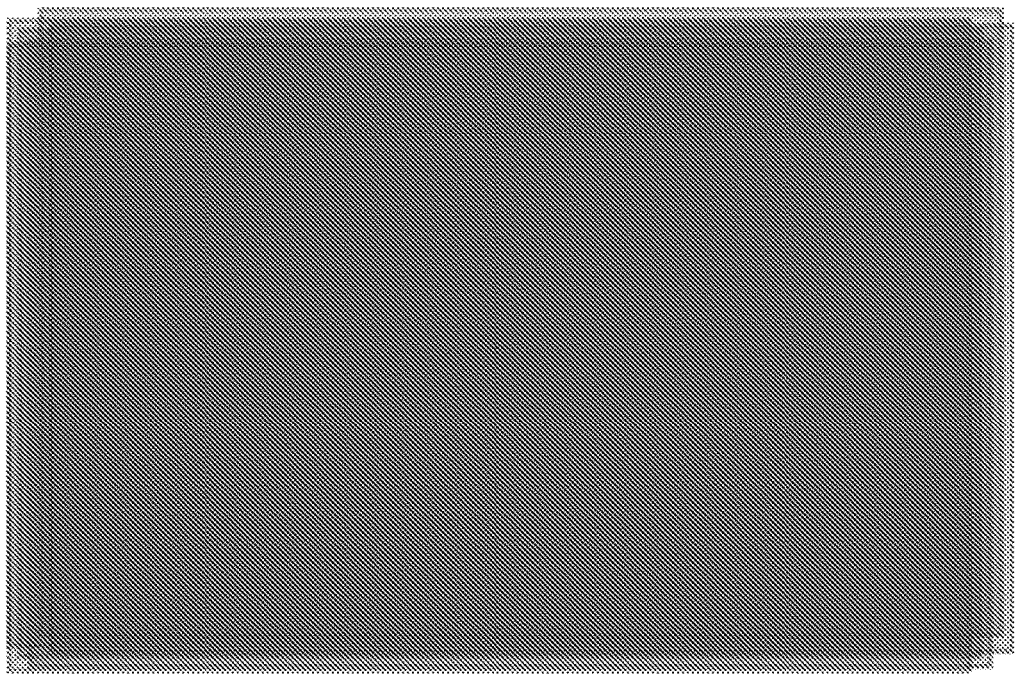
FIG. 46 is a conceptual diagram of projection areas of multiple projectors in the embodiment.
Figure 47:
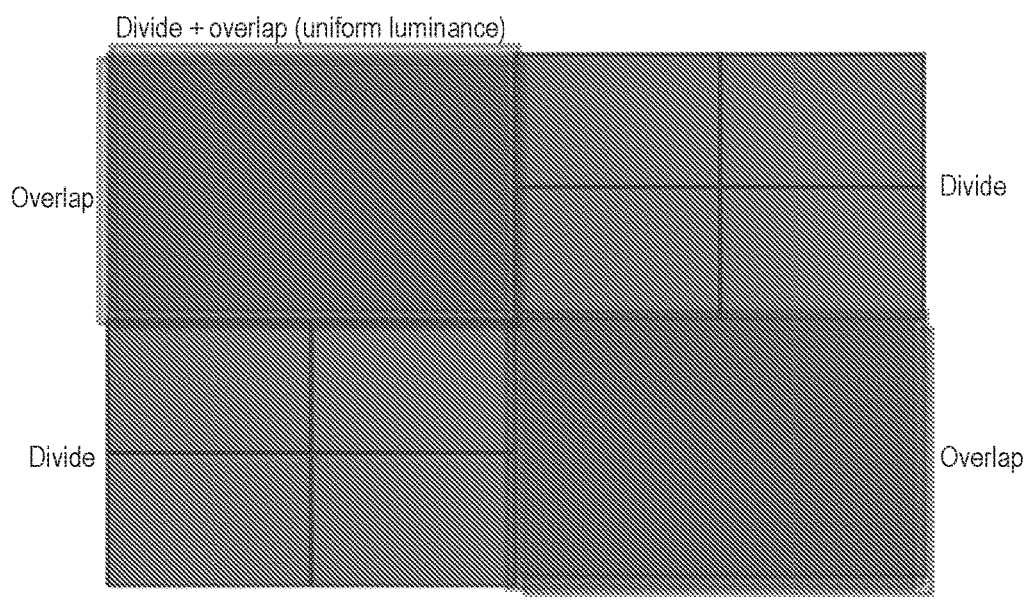
FIG. 47 is a conceptual diagram of projection areas of multiple projectors in the embodiment.
Figure 48:
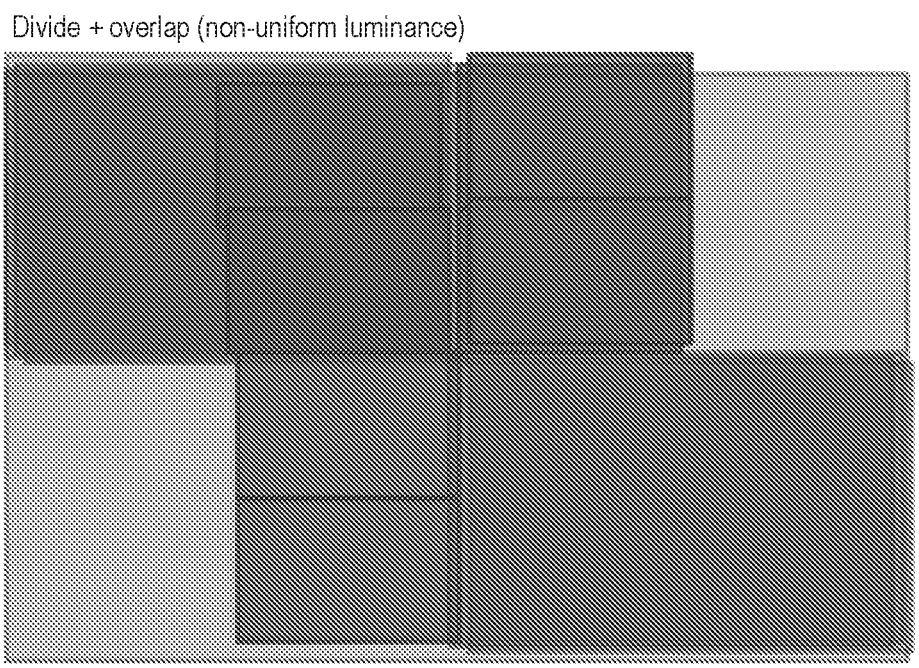
FIG. 48 is a conceptual diagram of projection areas of multiple projectors in the embodiment.
Figure 49:
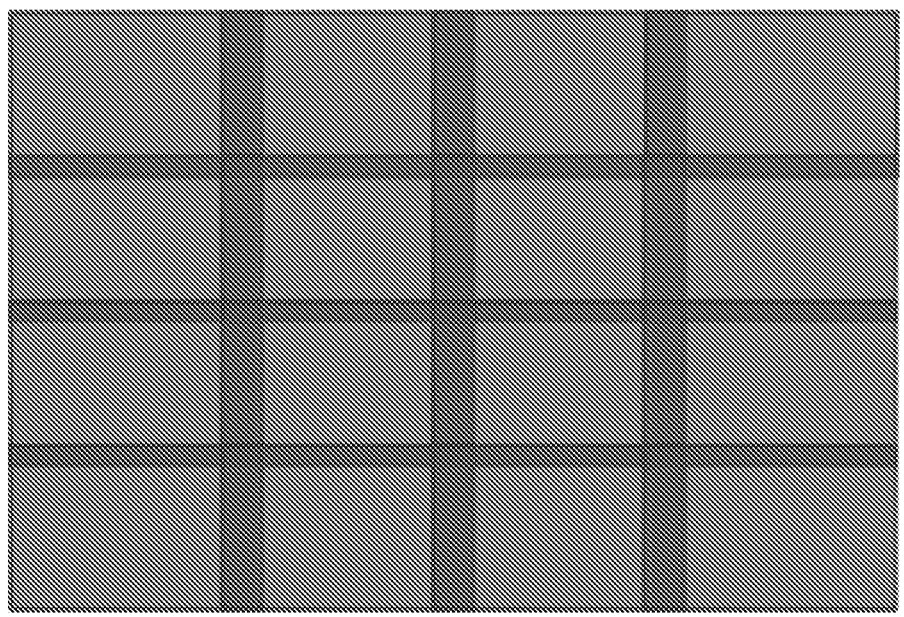
FIG. 49 is a conceptual diagram of projection areas of multiple projectors in the embodiment.

Furthermore, in this embodiment, the output regions to which the multiple image output parts 132 output the second images may not overlap each other as shown in FIG. 11, for example, or may overlap each other. The case in which the output regions overlap each other is, for example, a case as in FIG. 46 in which the output regions of the multiple image output parts 132 substantially as a whole overlap each other. The case in which the output regions overlap each other is, for example, a case as in FIG. 47 in which the output regions are each divided into two or more regions having a uniform luminance, some of the regions overlapping each other. The case in which the output regions overlap each other is, for example, a case as in FIG. 48 in which the output regions are each divided into two or more regions having non-uniform luminances, some of the regions overlapping each other. The case in which the output regions overlap each other is, for example, a case as in FIG. 49 in which only outer portions of the regions output by the two or more image processing parts 131 overlap each other (blending).

Furthermore, in the specific examples of this embodiment, the image output apparatus 1 performs optical output using projectors, but may perform printing using printers, or the like. Note that the printers may be inkjet printers or may be laser printers, for example, and the type thereof is not limited.

The processing in this embodiment may be realized by software. The software may be distributed by software downloads or the like. Furthermore, the software may be distributed in a form where the software is stored in a storage medium such as a CD-ROM. Note that the same is applied to other embodiments described in this specification. The software that realizes the image output apparatus 1 in this embodiment may be the following sort of program. Specifically, this program is a program for causing a computer to function as: an accepting unit that accepts first-image information, which is information related to a first image of a first band; and multiple image output units that output second images, each of which is an image of a second band that is narrower than or equal to the first band, using the first-image information, wherein a third image obtained as a result of output of the second images by the multiple image output units is an image of a third band that is wider than the first band.

Furthermore, it is preferable that the program causes the computer to further function as a control unit that determines information that is to be given to each of the multiple image output units, the information being an image using the first-image information accepted by the accepting unit, wherein the multiple image output units output second images, each of which is an image of a second band that is narrower than or equal to the first band, using the information determined by the control unit.

Furthermore, it is preferable that the program causes the computer to operate such that the control unit determines a partial image of the first image, the partial image being to be given to each of the multiple image output units.

Furthermore, it is preferable that the program causes the computer to operate such that the third band is a band that is wider than the first band in terms of space.

Furthermore, it is preferable that the program causes the computer to operate such that the third band is a band that is wider than the first band in terms of time.

Furthermore, it is preferable that the program causes the computer to operate such that the third band is a band that is wider than the first band in terms of gradation.

Furthermore, it is preferable that the program causes the computer to operate such that the image output units optically output the second images.

Furthermore, it is preferable that the program causes the computer to operate such that the image output units print the second images.

Furthermore, it is preferable that the program causes the computer to operate such that two second images output by at least two image output units of the multiple image output units partially overlap each other.

Furthermore, it is preferable that the program causes the computer to operate such that at least two image output units of the multiple image output units output at least two second images, while shifting, by a distance smaller than one pixel, positions to which the at least two image output units output the second images.

Furthermore, it is preferable that the program causes the computer to operate such that at least one image output unit of the multiple image output units includes: an image processing part that generates a second image having a resolution that is larger than a resolution of the first image, using the first-image information; and an image output part that outputs the second image generated by the image processing part.

Furthermore, it is preferable that the program causes the computer to further function as one or at least two drive units in association with at least one image output unit of the multiple image output units, the drive units being capable of changing a position of the image output unit.

Furthermore, it is preferable that the program causes the computer to operate such that the control unit determines a position of at least one image output unit of the multiple image output units, and the program causes the computer to further function as one or at least two drive units in association with the at least one image output unit of the multiple image output units, the drive units changing the position of the image output unit according to the determined position.

Figure 50:
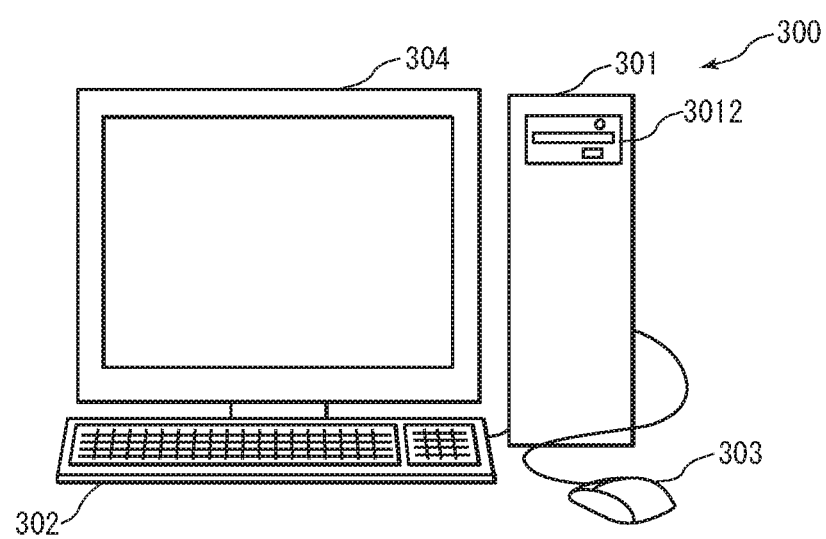
FIG. 50 is a schematic view of a computer system in the embodiment.
Figure 51:
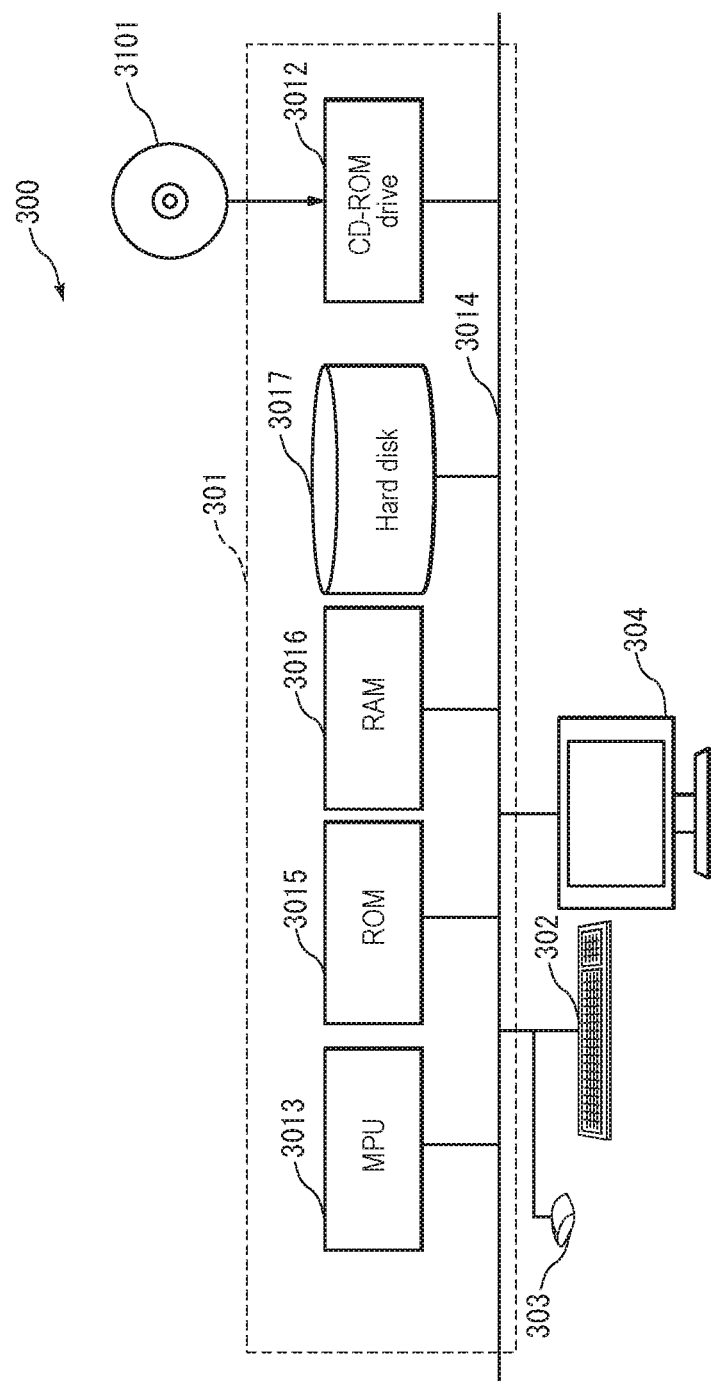
FIG. 51 is a block diagram of the computer system in the embodiment.

FIG. 50 shows the external appearance of a computer that executes the programs described in this specification to realize the image output apparatus 1 in the foregoing various embodiments. The foregoing embodiments may be realized using computer hardware and a computer program executed thereon. FIG. 50 is a schematic view of a computer system 300. FIG. 51 is a block diagram of the computer system 300.

In FIG. 50, the computer system 300 includes a computer 301 including a CD-ROM drive, a keyboard 302, a mouse 303, and a monitor 304.

In FIG. 51, the computer 301 includes not only the CD-ROM drive 3012, but also an MPU 3013, a bus 3014, a ROM 3015, a RAM 3016, and a hard disk 3017. The bus 3014 is connected to the MPU 3013 and the CD-ROM drive 3012. In the ROM 3015, a program such as a boot up program is stored. The RAM 3016 is connected to the MPU 3013, and is a memory in which a command of an application program is temporarily stored and a temporary storage area is provided. In the hard disk 3017, an application program, a system program, and data are stored. Although not shown, the computer 301 may further include a network card that provides connection to a LAN.

The program for causing the computer system 300 to execute the functions of the image output apparatus 1 in the foregoing embodiments may be stored in a CD-ROM 3101 that is inserted into the CD-ROM drive 3012, and be transmitted to the hard disk 3017. Alternatively, the program may be transmitted via an unshown network to the computer 301 and stored in the hard disk 3017. At the time of execution, the program is loaded into the RAM 3016. The program may be loaded from the CD-ROM 3101, or directly from a network.

The program does not necessarily have to include, for example, an operating system or a third party program to cause the computer 301 to execute the functions of the image output apparatus 1 in the foregoing embodiments. The program may only include a command portion to call an appropriate function (module) in a controlled mode and obtain the desired results. The manner in which the computer system 300 operates is well known, and thus a detailed description thereof has been omitted.

Furthermore, the computer that executes this program may be a single computer, or may be multiple computers. That is to say, centralized processing may be performed, or distributed processing may be performed.

Furthermore, in the foregoing embodiments, it will be appreciated that two or more communication parts (a terminal information transmitting unit, a terminal information receiving unit, etc.) in one apparatus may be physically realized by one medium.

Furthermore, in the foregoing embodiments, each process (each function) may be realized as centralized processing using a single apparatus (system), or may be realized as distributed processing using multiple apparatuses.

The present invention is not limited to the embodiments set forth herein. Various modifications are possible within the scope of the present invention.

INDUSTRIAL APPLICABILITY

As described above, the image output apparatus according to the present invention has an effect that it provides an image output apparatus in which a wide-band image can be output in a narrow band, and thus this apparatus is useful as a television apparatus and the like.

| List of Reference Numerals | |
|---|---|
| 1 | Image output apparatus |
| 11 | Accepting unit |
| 12 | Control unit |
| 13 | Image output unit |
| 14 | Drive units |
| 131 | Image processing part |
| 132 | Image output part |

The invention claimed is:

1. An image output method performed by a computer executing a program stored in a non-transitory storage medium, the method comprising:
receiving, by the computer, a first image having a first band;
generating, by the computer, multiple second images by using spatially divided images of the first-image;
outputting, to multiple optical projectors, the multiple second images; and
projecting, by the multiple optical projectors, the multiple second images onto a screen so that the multiple second images are optically synthesized into a third image on the screen having a third band that is wider than the first band, wherein:
each of the multiple second images has a second band that is narrower than the first band,
the multiple optical projectors includes a first optical projector, a second optical projector and a third optical projector,
the first and second optical projector project at least two of the multiple second images such that the at least two of the multiple second images overlaps with each other and are optically synthesized on the screen, thereby forming a part of the third image,
the third optical projector projects at least one of the multiple second images on the screen, thereby forming another part of the third image,
the first image is a moving picture, the generating includes:
  generating multiple second images having different timing by increasing a temporal resolution of the at least part of the first image,
the third band is wider than the first band in terms of time,
the at least two of the multiple second images includes a first moving picture having a first temporal resolution and a second moving picture having the first temporal resolution and different timing than the first moving picture, and
the first moving picture is output from the first optical projector and the second moving picture is output from the second optical projector.

2. The image output method of claim 1, wherein the first and second optical projectors project the at least two of the multiple second images such that at least one of the at least two of the multiple second images is shifted on the screen with respect to at least another of the at least two of the multiple second images by a predetermined shift amount so that the part of the third image has a higher band than each of the at least two of the multiple second images.

3. The image output method of claim 2, wherein the predetermined shift amount is less than a size of one pixel of the one of the multiple second images on the screen.

4. An image output apparatus, comprising:
  multiple optical projectors;
  a computer; and
  a non-transitory storage medium storing a program stored in a non-transitory storage medium, wherein:
  the program, when executed by the computer, causes the computer to perform:
    receiving a first image having a first band;
    generating multiple second images by using spatially divided images of the first-image; and
    outputting the multiple second images to the multiple optical projectors,
  each of the multiple second images has a second band that is narrower than the first band,
  the multiple optical projectors project the second images onto a screen so that the multiple second images are optically synthesized into a third image on the screen having a third band that is wider than the first band,
  the multiple optical projectors includes a first optical projector, a second optical projector and a third optical projector,
  the first and second optical projector project at least two of the multiple second images are generated such that the at least two of the multiple second images overlaps with each other and are optically synthesized on the screen, thereby forming a part of the third image,
  the third optical projector projects at least one of the multiple second images on the screen, thereby forming another part of the third image,
  the first image is a moving picture,
  the computer performed, in the generating:
    generating multiple second images having different timing by increasing a temporal resolution of at least a part of the first image,
  the third band is wider than the first band in terms of time,
  the at least two of the multiple second images includes a first moving picture having a first temporal resolution and a second moving picture having the first temporal resolution and different timing than the first moving picture, and
  the first moving picture is output from the first optical projector and the second moving picture is output from the second optical projector.

5. The image output apparatus of claim 4, wherein the first and second optical projectors project the two of the multiple second images such that one of the multiple second images is shifted on the screen with respect to another of the multiple second images by a predetermined shift amount so that the part of the third image has a higher band than each of the at least two of the multiple second images.

6. The image output apparatus of claim 5, wherein the predetermined shift amount is less than a size of one pixel of the one of the multiple second images on the screen.

7. The image output method of claim 1, wherein one or more of the first, second and third projectors include two or more optical projectors.

8. The image output apparatus of claim 4, wherein one or more of the first, second and third projectors include two or more optical projectors.

* * * * *